United States Patent
Fukunaga et al.

(10) Patent No.: US 7,662,516 B2
(45) Date of Patent: Feb. 16, 2010

(54) ELECTRODE PLATE OF POSITIVE ELECTRODE FOR NON-AQUEOUS ELECTROLYTE SECONDARY BATTERY AND MANUFACTURING METHOD THEREOF

(75) Inventors: Masao Fukunaga, Sakai (JP); Kohei Suzuki, Yao (JP); Katsumi Kashiwagi, Moriguchi (JP); Akira Kuroda, Toyota (JP); Yasuhiro Inadomi, Shimonoseki (JP); Masanori Sumihara, Higashiosaka (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 11/146,350

(22) Filed: Jun. 7, 2005

(65) Prior Publication Data
US 2005/0271940 A1      Dec. 8, 2005

(30) Foreign Application Priority Data

| Jun. 7, 2004 | (JP) | ............................. 2004-168121 |
| Jun. 7, 2004 | (JP) | ............................. 2004-168122 |
| Jun. 7, 2004 | (JP) | ............................. 2004-168123 |
| Jun. 7, 2004 | (JP) | ............................. 2004-168240 |
| Jun. 7, 2004 | (JP) | ............................. 2004-168241 |
| Jun. 7, 2004 | (JP) | ............................. 2004-168242 |

(51) Int. Cl.
*H01M 4/62* (2006.01)
*H01M 4/00* (2006.01)

(52) U.S. Cl. ....................................... 429/232; 429/128
(58) Field of Classification Search .................. 429/217, 429/232, 188
See application file for complete search history.

(56) References Cited

U.S. PATENT DOCUMENTS

| 6,110,619 A | 8/2000 | Zhang et al. |
| 6,312,853 B1 | 11/2001 | Zhang et al. |
| 2003/0068551 A1* | 4/2003 | Fukunaga et al. ........... 429/217 |
| 2005/0250010 A1* | 11/2005 | Kurihara et al. ............. 429/217 |

FOREIGN PATENT DOCUMENTS

CN         1285085 A        2/2001

(Continued)

OTHER PUBLICATIONS

Chinese Office Action, issued in Chinese Patent Application No. 2007101019293, dated Aug. 14, 2009.

*Primary Examiner*—Dah-Wei D Yuan
*Assistant Examiner*—Zachary Best
(74) *Attorney, Agent, or Firm*—McDermott Will & Emery LLP

(57) ABSTRACT

A method for manufacturing a positive electrode plate for a non-aqueous secondary battery including: preparing an active material A, a conductive material B, a binder C, a thickener D, and a liquid component E, the thickener D being in a powder state, the conductive material B including a carbon material, the thickener D including a water-soluble polymer, and the liquid component E including water; preparing a slurry including the component E and an electrode material mixture, the material mixture including the active material A, the conductive material B, the binder C, and the thickener D; and applying the slurry on a current collector. In preparing the slurry, the thickener D in a powder state, the active material A and the conductive material B are kneaded together with the liquid component E, and then the primary kneaded matter, the binder C, and an additional liquid component are kneaded.

23 Claims, 1 Drawing Sheet

FOREIGN PATENT DOCUMENTS

| | | |
|---|---|---|
| CN | 1485940 A | 3/2004 |
| JP | 07-161350 | 6/1995 |
| JP | 08-339828 | 12/1996 |
| JP | 09-213309 | 8/1997 |
| JP | 10-144302 | 5/1998 |
| JP | 11-025956 | 1/1999 |
| JP | 2000348713 * | 3/1999 |
| JP | 11-144714 | 5/1999 |
| JP | 11-213989 | 8/1999 |
| JP | 2000-348713 | 12/2000 |
| JP | 2000-353516 | 12/2000 |
| JP | 2001-167756 | 6/2001 |
| WO | WO2004051770 * | 6/2004 |

* cited by examiner

ELECTRODE PLATE OF POSITIVE ELECTRODE FOR NON-AQUEOUS ELECTROLYTE SECONDARY BATTERY AND MANUFACTURING METHOD THEREOF

FIELD OF THE INVENTION

The present invention relates to an electrode plate of a positive electrode for a non-aqueous secondary battery represented by a lithium ion secondary battery, and a manufacturing method thereof.

BACKGROUND OF THE INVENTION

In recent years, a lithium ion secondary battery used as a power source for a portable electronic device is a mainstream of non-aqueous secondary batteries. A lithium ion secondary battery generally comprises a positive electrode formed of a positive electrode current collector carrying a positive electrode material mixture, and a negative electrode formed of a negative electrode current collector carrying a negative electrode material mixture. The positive electrode material mixture includes a positive electrode active material formed of a composite oxide of a transition metal and lithium, a conductive material, and the like. The negative electrode material mixture includes a negative electrode active material formed of a carbon material and the like which can store and release lithium. Although a lithium ion secondary battery has high voltage and high capacity, an improvement is desired due to a decrease in capacity through charge and discharge (hereinafter referred to as "charge/discharge") cycles.

As one of the causes of the decrease in capacity through charge/discharge cycles, a decrease in electron conductivity of an electrode can be mentioned. The decrease in electron conductivity is caused by a partial fracture of a conductive network structure formed of a conductive material due to expansion and contraction of a positive electrode through charge/discharge cycles. In order to secure sufficient electron conductivity even with the partial fracture of the conductive network structure, a content by percentage of the conductive material included in the electrode material mixture may be increased, or a content by percentage of a non-conductor included in the electrode material mixture, i.e., binder and/or thickener, may be decreased.

However, the conductive material itself does not contribute to a battery capacity, and a usage of the conductive material in great amount causes a reduction in the battery capacity. Thus, a decrease in the content by percentage of a binder and/or a thickener included in a positive electrode material mixture is desired.

Additionally, in view of decreasing an environmental burden, it is desirable to use water as a dispersion medium for an electrode material mixture slurry. The electrode material mixture slurry is prepared by mixing an electrode material mixture with a liquid component as a dispersion medium. The slurry is applied on a current collector to make the material mixture carried on the current collector. Thus, attempts to decrease the content by percentage of a binder and/or a thickener have been made, especially for the cases where water is used as a dispersion medium.

Conventionally, a fluorocarbon resin such as polytetrafluoroethylene (PTFE) is used as a binder (see Japanese Laid-Open Patent Publication No. Hei 08-339828). However, a fluorocarbon resin is low in viscosity, and its binding property is developed by chain entanglement. Therefore, when the content by percentage of a binder is decreased, the electrode material mixture tends to easily separate from a current collector, thereby causing a reduction in capacity.

Hence, there has been proposed a usage of a copolymer of 2-ethylhexyl acrylate, acrylic acid, and acrylonitrile as a binder (see Japanese Laid-Open Patent Publication No. Hei 11-25956). According to this proposal, a total amount of a binder and a thickener can be decreased to 2.6 parts by weight per 100 parts by weight of an active material. Also, an excellent cycle life is obtained even when a conductive material is decreased to 5 parts by weight per 100 parts of an active material.

However, when an amount of the materials other than an active material, i.e., a conductive material, a binder, and a thickener, to be mixed is decreased, gradually, it becomes difficult to uniformly disperse these materials in a liquid component which is to be a dispersion medium. Thus, an electrode material mixture slurry becomes unstable, and a conductive material becomes vulnerable to re-coagulation due to a shearing force while an electrode material mixture slurry is applied on a current collector and then dried. As a result, the weight of the applied electrode material mixture becomes non-uniform depending upon a position on the current collector.

Causes may vary, but mainly the unstable electrode material mixture slurry is caused by a great difference in surface free energy between a conductive material and a dispersion medium when using water as a dispersion medium. Between the materials having a great difference in surface free energy, affinity is low. When affinity between a conductive material and a dispersion medium is low, a conductive material becomes vulnerable to re-coagulation.

General preparing steps of conventional electrode material mixture slurry comprise one step: adding a liquid component to be a dispersion medium into a mixture including an active material, binder, and the like, all the amount together at once and then kneading the mixture. However, in the above step, because a sufficient shearing force is not given to the conductive material, dispersion state of the electrode material mixture in the obtained slurry and viscosity of the slurry easily become unstable. In order to prepare a stable electrode material mixture slurry, a method to disperse an electrode material mixture in a liquid component should be considered well.

In view of the above, the following have been proposed. Japanese Laid-Open Patent Publication No. Hei 9-213309 suggests that after kneading a conductive material, a binder, and a dispersion medium, an active material is added and then further kneaded. Japanese Laid-Open Patent Publication No. Hei 10-144302 suggests that after kneading a conductive material and a dispersion medium, an active material and a binder are added and then further kneaded. Japanese Laid-Open Patent Publication No. Hei 11-144714 suggests that after kneading a binder and a dispersion medium, an active material and a conductive material are added and then further kneaded. Japanese Laid-Open Patent Publication No. Hei 11-213989 suggests that after kneading a conductive material and a dispersion medium, an active material is added and further kneaded, and then a binder is added and kneaded.

However, in any of the above methods, since almost a total amount of a dispersion medium is admixed at once, an electrode material mixture slurry is kneaded without a sufficient shearing force being given to a conductive material. In such methods, it is difficult to stabilize a dispersion state of the electrode material mixture, viscosity of the slurry, and the like.

Additionally, the following have been proposed. Japanese Laid-Open Patent Publication No. Hei 7-161350 suggests that a dispersion medium is added, by adjusting its amount, to a mixture of a conductive material, a binder, and an active material in order to decrease an amount of necessary dispersion medium and to shorten the time for drying. Japanese Laid-Open Patent Publication No. 2000-353516 suggests that the same method as the above Publication No. Hei 7-161350 is conducted in order to improve a dispersion state of an electrode material mixture in the slurry, and a binding property of an electrode material mixture and a current collector. Japanese Laid-Open Patent Publication No. 2001-167756 suggests that a dispersion medium is dividedly added several times in trace amounts to a mixture of an active material, a conductive material, and a binder dissolved in a dispersion medium.

In any of the above proposals, an electrode material mixture slurry is kneaded in a state in which a shearing force is given to the conductive material, since a dispersion medium is dividedly added. However, in any of these proposals, an organic solvent which has high affinity with a conductive material is used as a dispersion medium. In the case where an organic dispersion medium is used, when an excessive shearing force is given to a mixture, a coagulation of a conductive material is adversely prompted. Therefore, in addition to a problem of organic solvent waste, there is a problem in that the amounts of a binder and a conductive material to be added to an active material can not be decreased.

Thus, there has been proposed a method in which water is used as a dispersion medium, and carboxymethyl cellulose (CMC), which is a water-soluble polymer, is used as a thickener, and an aqueous solution of the thickener is dividedly added several times to a mixture kneaded to become a thick paste (see Japanese Laid-Open Patent Publication No. 2000-348713). According to this method, in a step of applying the electrode material mixture slurry on a current collector, a yield rate can be improved since coagulation in the electrode material mixture slurry can be reduced.

However, it is difficult to reduce even invisible, fine coagulation in this method. In particular, there is a problem in that a weight of an electrode material mixture to be applied becomes non-uniform, depending on a position on a current collector, due to re-coagulation of a conductive material caused by a low affinity between the conductive material and a dispersion medium. As a result, capacity varies depending on a position on an electrode plate, and a cycle life of a battery will deteriorate. Such a problem becomes particularly noticeable when manufacturing an electrode plate by using an electrode material mixture slurry left for a while after preparation.

Also, conventionally, a thickener is dissolved in a liquid component to be a dispersion medium in advance, and used as a solution. However, in order to prepare a solution efficiently by prompting a dissolution of the thickener, which is usually hardly soluble, a powerful mixer such as a homogenizer is needed. Although a strong convection can be given to a mixture of a thickener and a dispersion medium by using a homogenizer and the like, there is a problem in that the molecular entanglement which is the base of the thickening effect of the thickener is destroyed and the thickening effect is decreased.

SUMMARY OF THE INVENTION

An object of the present invention is to provide a method of manufacturing an electrode plate which can effectively suppress re-coagulation of a conductive material caused by a low affinity between a conductive material and a dispersion medium, in the case of preparing an electrode material mixture slurry including a water-soluble polymer as a thickener, and water as a liquid component to be a dispersion medium.

Additionally, an object of the present invention is to suppress the breakage of molecular entanglement of thickener and to improve the effects of the thickener.

The present invention relates to a method for manufacturing an electrode plate of a positive electrode for a non-aqueous secondary battery comprising the steps of:

(a) preparing an active material A, a conductive material B, a binder C, a thickener D, and a liquid component E, the thickener D being in a powder state and being soluble in the liquid component E, the conductive material B comprising at least a carbon material, the thickener D comprising at least a water-soluble polymer, and the liquid component E comprising at least water;

(b) preparing an electrode material mixture slurry comprising the liquid component E and an electrode material mixture comprising the active material A, the conductive material B, the binder C, and the thickener D, and (c) applying the slurry on a current collector, wherein the step (b) includes kneading the thickener D in a powder state, the active material A and the conductive material B together with the liquid component E to prepare a primary kneaded matter, and then kneading the primary kneaded matter, the binder C, and an additional liquid component to prepare the slurry as a secondary kneaded matter.

In a manufacturing method according to the present invention, the step of preparing an electrode material mixture slurry comprises a primary kneading and a secondary kneading. In the primary kneading step, the thickener D in a powder state, the active material A, and the conductive material B are being kneaded together with the liquid component E to prepare a primary kneaded matter. In the secondary kneading, the primary kneaded matter, the binder C, and an additional liquid component are being kneaded to prepare a secondary kneaded matter. The primary kneading, in other words, is a step in which a mixture comprising an active material, a conductive material, and a powdered thickener is wetted by a liquid component as a dispersion medium, and then thickly kneaded. A prominent characteristic of the primary kneading is that a powdered thickener is mixed with an active material and a conductive material.

When a preparing step of electrode material mixture slurry comprises a plurality of kneading steps, generally, the more shearing force in the primary kneading, the easier a homogenized dispersion of a conductive material and the like will be. The present invention is mainly characterized in that a decrease in thickening effect is prevented, while a shearing force in the primary kneading is enhanced by improving a way of adding a thickener in preparing an electrode material mixture slurry.

It is preferable that the binder C is dispersed in the additional liquid component and added to the primary kneaded matter in the secondary kneading.

It is preferable that at least the additional liquid component is added in portions to the primary kneaded matter in a plurality of times in the secondary kneading.

It is preferable that the additional liquid component is the same as the liquid component E used in preparing the primary kneaded matter.

It is preferable that the binder C is particulate and particularly, that the binder C includes at least rubber particles having acrylonitrile units, or the binder C consists of rubber particles having acrylonitrile units.

It is preferable that an amount of the conductive material B included in the electrode material mixture is 1 to 2.5 parts by weight per 100 parts by weight of the active material A.

It is preferable that an amount of the binder C included in the electrode material mixture is 0.2 to 1.4 parts by weight per 100 parts by weight of the active material A.

It is preferable that an amount of the thickener D included in the electrode material mixture is 0.2 to 0.8 parts by weight per 100 parts by weight of the active material A.

It is preferable that a viscosity of an aqueous solution dissolving 1 wt % thickener D is 2.5 to 18 Pa·s at 25° C. It is preferable that the thickener D at least includes carboxymethyl cellulose, or consists of carboxymethyl cellulose.

It is preferable that a specific surface area of the active material A measured by BET method is 0.2 to 0.8 m²/g. It is preferable that the active material A is at least formed of a composite oxide of a transition metal and lithium.

It is preferable that a manufacturing method of the present invention further has a step in which the coating of the electrode material mixture slurry applied on the current collector is dried, and an electrode material mixture layer having 18 to 28% porosity is obtained from the dried coating. It is preferable that the step includes pressing the dried coating. Herein, the porosity is a volume percentage of micropores in the material mixture layer.

It is preferable that an exposed part of the current collector not carrying the electrode material mixture layer on both sides thereof, to which a lead is not supposed to be connected is formed. The exposed part is formed in at least one position on the current collector.

The present invention further relates to an electrode plate of a positive electrode for a non-aqueous secondary battery. In particular, the present invention relates to an electrode plate of a positive electrode for a non-aqueous secondary battery having an electrode material mixture layer and a current collector supporting the electrode material mixture layer, the electrode material mixture layer comprising an active material A, a conductive material B, a binder C, and a thickener D, the conductive material B comprising at least a carbon material, the thickener D comprising at least a water-soluble polymer, an amount of the conductive material B contained in the electrode material mixture layer being 1 to 2.5 parts by weight per 100 parts by weight of the active material A, and an amount of the thickener D contained in the electrode material mixture layer being 0.2 to 0.8 parts by weight per 100 parts by weight of the active material A.

In an electrode plate of a positive electrode according to the present invention, it is preferable that a specific surface area of the active material A measured by BET method is 0.2 to 0.8 m²/g. Also, it is preferable that an amount of the binder C included in the electrode material mixture is 0.2 to 1.4 parts by weight per 100 parts by weight of the active material A. It is preferable that the binder C is of particulate, and at least includes rubber particles having at least acrylonitrile units, or consists of rubber particles having acrylonitrile units. Further, it is preferable that the thickener D at least includes carboxymethyl cellulose, or consists of carboxymethyl cellulose, and a viscosity of an aqueous solution dissolving 1 wt % thickener D is 2.5 to 18 Pa·s at 25° C. Further, it is preferable that a porosity of the electrode material mixture layer is 18 to 28%, and the current collector has, in at least one position, an exposed part not supporting the electrode material mixture layer on both sides thereof, to which a lead is not supposed to be connected.

The preferred embodiments of the present invention are described in the following.

EMBODIMENT 1

This embodiment relates to a method for manufacturing an electrode plate of a positive electrode for a non-aqueous secondary battery comprising the steps of:

(a) preparing an active material A, a conductive material B, a binder C, a thickener D, and a liquid component E, the thickener D being in a powder state and being soluble in the liquid component E, the conductive material B comprising at least a carbon material, the thickener D comprising at least a water-soluble polymer, and the liquid component E comprising at least water, (b) preparing a slurry comprising the liquid component E and an electrode material mixture comprising the active material A, the conductive material B, the binder C, and the thickener D, and (c) applying the slurry on a current collector, wherein the step (b) includes kneading the thickener D in a powder state, the active material A and the conductive material B together with the liquid component E to prepare a primary kneaded matter, and then kneading the primary kneaded matter, the binder C, and an additional liquid component to prepare the slurry as a secondary kneaded matter, an amount of the conductive material B contained in the electrode material mixture is 1 to 2.5 parts by weight per 100 parts by weight of the active material A, and an amount of the binder C contained in the electrode material mixture is 0.2 to 1.4 parts by weight per 100 parts by weight of the active material A.

A main purpose of this embodiment is to suppress an increase in an amount of gas generation while a battery is stored in high temperature, when contacting surface area between the conductive material and a non-aqueous electrolyte in a battery is increased relatively, due to a decrease in amounts of a binder and a thickener included in an electrode material mixture. In this embodiment, a gas generation in a battery while the battery is stored at a high temperature can be suppressed, because an amount of a conductive material included in an electrode material mixture is restricted.

EMBODIMENT 2

This embodiment relates to a method for manufacturing an electrode plate of a positive electrode for a non-aqueous secondary battery comprising the steps of:

(a) preparing an active material A, a conductive material B, a binder C, a thickener D, and a liquid component E, the thickener D being in a powder state and being soluble in the liquid component E, the conductive material B comprising at least a carbon material, the thickener D comprising at least a water-soluble polymer, and the liquid component E comprising at least water;

(b) preparing a slurry comprising the liquid component E and an electrode material mixture comprising the active material A, the conductive material B, the binder C, and the thickener D, and (c) applying the slurry on a current collector, wherein the step (b) includes kneading the thickener D in a powder state, the active material A and the conductive material B together with the liquid component E to prepare a primary kneaded matter, and then kneading the primary kneaded matter, the binder C, and an additional liquid component to prepare the slurry as a secondary kneaded matter, an amount of the binder C contained in the electrode material mixture is 0.2 to 1.4 parts by weight per 100 parts by weight of the active material A, and a viscosity of an aqueous solution dissolving 1 wt % thickener D is 2.5 to 18 Pa·s at 25° C.

In this embodiment, a stable electrode material mixture slurry such as in the following can be obtained: the contents of a thickener and a conductive material are small, a dispersion state of the conductive material and the like is homogenous, and the dispersion state can be maintained for a longer period of time. Therefore, a non-aqueous secondary battery with less variation in battery capacity, with excellent cycle life, and with high capacity can be provided.

EMBODIMENT 3

This embodiment relates to a method for manufacturing an electrode plate of a positive electrode for a non-aqueous secondary battery comprising the steps of:

(a) preparing an active material A, a conductive material B, a binder C, a thickener D, and a liquid component E, the thickener D being in a powder state and being soluble in the liquid component E, the conductive material B comprising at least a carbon material, the thickener D comprising at least a water-soluble polymer, and the liquid component E comprising at least water;

(b) preparing a slurry comprising the liquid component E and an electrode material mixture comprising the active material A, the conductive material B, the binder C, and the thickener D, and (c) applying the slurry on a current collector, wherein the step (b) includes kneading the thickener D in a powder state, the active material A and the conductive material B together with the liquid component E to prepare a primary kneaded matter, and then kneading the primary kneaded matter, the binder C, and an additional liquid component to prepare the slurry as a secondary kneaded matter, a specific surface area of the active material A measured by BET method is 0.2 to 0.8 m²/g, and an amount of the binder C contained in the electrode material mixture is 0.2 to 1.4 parts by weight per 100 parts by weight of the active material A.

A main purpose of this embodiment is to suppress evolution of heat from a battery in overcharged state, by restricting a specific surface area of the active material measured by BET method. In this embodiment, a non-aqueous secondary battery with less variation in battery capacity, with excellent cycle life, and with high capacity can be provided. Further, a higher capacity design and higher safety than conventionally achieved can be achieved both at the same time for a non-aqueous secondary battery.

EMBODIMENT 4

This embodiment relates to a method for manufacturing an electrode plate of a positive electrode for a non-aqueous secondary battery comprising the steps of:

(a) preparing an active material A, a conductive material B, a binder C, a thickener D, and a liquid component E, the thickener D being in a powder state and being soluble in the liquid component E, the conductive material B comprising at least a carbon material, the thickener D comprising at least a water-soluble polymer, and the liquid component E comprising at least water;

(b) preparing a slurry comprising the liquid component E and an electrode material mixture comprising the active material A, the conductive material B, the binder C, and the thickener D, (c) applying the slurry on a current collector; and (d) drying the coating of the slurry applied on the current collector and forming an electrode material mixture layer having 18 to 28% porosity from the dried coating, wherein the step (b) includes kneading the thickener D in a powder state, the active material A and the conductive material B together with the liquid component E to prepare a primary kneaded matter, and then kneading the primary kneaded matter, the binder C, and an additional liquid component to prepare the slurry as a secondary kneaded matter, and an amount of the binder C contained in the electrode material mixture is 0.2 to 1.4 parts by weight per 100 parts by weight of the active material A.

A main purpose of this embodiment is to reduce the problems such as an internal short circuit to improve the safety of a non-aqueous secondary battery, and to easily and quickly impregnate an electrode group having a positive electrode, a negative electrode, and a separator with a non-aqueous electrolyte.

A dried coating of the electrode material mixture slurry, which is an intermediate product of an electrode material mixture layer, has an excellent elasticity, and thus fractures and the like of the current collector can be suppressed, even when the dried coating is pressed by high pressure. Therefore, the yield rate will not be decreased, even when an electrode material mixture layer with low porosity of 18 to 28% is obtained by intensely compressing the dried coating.

In an electrode group including a positive electrode and a negative electrode wound with a separator interposed therebetween, it is desired not to form electrode material mixture layers on both sides of the positive electrode current collector portion which is forming an outermost perimeter of the electrode group, and desired to render the positive electrode current collector portion as an exposed part. It is known that the exposed part of the positive electrode current collector on the outermost perimeter can function as a safety mechanism to counter problems such as an internal short circuit. However, because there is a boundary between the dried coating and the exposed part on the current collector, normally, it is difficult to compress intensely the dried coating without fracture and the like of the current collector. On the other hand, according to this embodiment, an electrode material mixture layer with 18 to 28% porosity can be obtained without fracture and the like of the current collector even in such a case.

In this embodiment, since a porosity of the electrode material mixture layer is suppressed to 28% or less, a loosening of the conductive network formed of the conductive material is suppressed, thereby achieving an excellent capacity retention rate. Additionally, impregnation of an electrode group having a positive electrode, a negative electrode, and a separator with a non-aqueous electrolyte can be conducted easily and quickly, thereby enabling to achieve higher productivity. The quicker impregnation of an electrode group with a non-aqueous electrolyte is probably because a free thickener can hardly remain in the electrode material mixture layer when a thickener in a powder state is mixed with an active material. The free thickener can be a barrier to the impregnation. Also, a thickener completely dispersed in an electrode material mixture layer has an effect to accelerate a uniform distribution of rubber particles, thereby enabling to obtain an electrode material mixture layer highly excellent in elasticity.

According to the present invention, a stable electrode material mixture slurry can be obtained: in such a slurry, a dispersion state of the conductive material and the like is uniform, and the dispersion state can be maintained for a longer period of time. That is, according to the present invention, a high shearing force is given to a mixture due to high viscosity of the mixture in the primary kneading compared with a conventional method using a thickener solution. Based on this, a weight of an electrode material mixture slurry to be applied will not vary depending upon its position on the current collector, thereby enabling a uniform electrode plate. Therefore, according to the present invention, a non-aqueous secondary battery with excellent cycle life and less variation in battery capacity can be provided.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
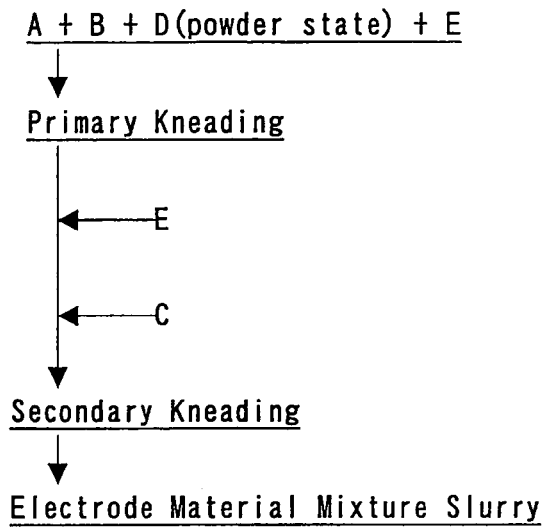
FIG. 1 is a flow chart illustrating the steps of preparing a positive electrode material mixture slurry of the present invention.

The present invention relates to a method for manufacturing an electrode plate of a positive electrode for a non-aqueous secondary battery comprising the steps of:

(a) preparing an active material A, a conductive material B, a binder C, a thickener D, and a liquid component E;

(b) preparing an electrode material mixture slurry comprising the liquid component E and an electrode material mixture comprising the active material A, the conductive material B, the binder C, and the thickener D; and (c) applying the slurry on a current collector.

The preparing method of the electrode material mixture slurry includes a primary kneading and a secondary kneading. By using a thickener in a powder state in the primary kneading, the thickening effect of the thickener can be enhanced to the maximum, while a dispersion state of the materials forming an electrode material mixture such as a conductive material is improved compared with a conventional method.

The reason for using a thickener and a binder separately in different steps is described in the following.

Generally, a thickener is easily adsorbed on an active material and the thickening effect can not be fully exerted. Therefore, in order to uniformly disperse the conductive material in a slurry, a kneading for a longer period of time is necessary to give a sufficient shearing force to the conductive material. On the other hand, a binder tends to coagulate, adversely, due to separation of a surfactant or the like when being kneaded for a longer period of time. Therefore, when a binder and a thickener are simultaneously mixed together, regardless of a kneading duration, distribution of the binder and the conductive material in the slurry becomes inhomogeneous, thereby making it impossible to decrease the amounts of the binder and the conductive material. On the other hand, when a thickener and a binder are to be mixed with an active material separately in different steps, kneading conditions appropriate for each step can be adopted. Therefore, a uniform dispersion for both can be possible, and a sufficient binding property can be obtained even with significantly reduced amounts of both, thereby making it possible to achieve an electrode plate with high capacity as a result.

The reason for using a thickener in a powder state is described in the following.

A solution in which a thickener is dissolved in a dispersion medium has an appropriate viscosity for preparing a slurry and is easy to handle. Thus, in a preparing step for an electrode material mixture slurry, a solution of a thickener is generally kneaded with an active material, a conductive material, and the like collectively. However, since a thickener is generally hard to dissolve in a dispersion medium, in order to prepare a solution of the thickener, a molecular entanglement of the thickener should be destroyed forcefully. However, the homogenizing process by breaking molecular entanglement deteriorates the thickening effect of the thickener, while accelerating dissolving of a thickener. The molecular entanglement is a base of the thickening effect.

When a thickener is mixed in a powder state in a primary kneading, the effect of the thickener is not damaged, and a viscosity of the mixture in the primary kneading can be sufficient, even the thickener is used in small amount. Additionally, due to the higher viscosity of the mixture in the primary kneading, a higher shearing force is given to the mixture, thereby dispersion state of the conductive material and the like in the slurry can be improved. Therefore, the electrode material mixture slurry is stabilized for a longer period of time, and a weight of the electrode material mixture slurry to be applied on the current collector will not vary depending upon a position on the current collector, thereby improving a cycle life of a battery as a result.

In the primary kneading, a liquid component as a dispersion medium is added to a mixture including an active material, a conductive material, and a thickener in a powder state, first, to wet the mixture with the liquid component. Then, the primary kneading of the mixture in higher viscosity is conducted, to uniformly disperse the conductive material and the thickener in the dispersion medium. The amount of the liquid component to be used is preferably in such range that a solid content by percentage in the primary kneaded matter is 70 to 90 wt %. The primary kneading step corresponds to so-called a thickly kneading process of a mixture. Other than an active material, a conductive material, and a thickener in a powder state, the mixture may include various additives of appropriate amount.

Although it is necessary to use a liquid component that is able to dissolve a thickener, the thickener needs not be dissolved completely at the primary kneading. It is just necessary to conduct the kneading until the thickener is swollen by the liquid component, and uniformly dispersed in the primary kneaded matter.

Next, a secondary kneading is conducted by adding a binder and an additional liquid component as the dispersion medium to the primary kneaded matter, to prepare an electrode material mixture slurry which is adjusted to the most appropriate viscosity for applying to a current collector. The amount of the liquid component to be used in the secondary kneading is preferably in such a range that a solid content by percentage of the secondary kneaded matter is 50 to 80 wt %.

In the secondary kneading, it is preferable that a binder C dispersed in at least a part of the additional liquid component is added to the primary kneaded matter. Usually, a binder C already dispersed in a liquid component is commercially available.

It is preferable that the additional liquid component is added to the primary kneaded matter several times, preferably twice in portions. When the time for the addition is increased to become more than twice, stability of the electrode material mixture slurry does not change much. As for the binder C as well, it may be added to the primary kneaded matter in a plurality of times by dividing it into portions.

The thickener includes at least a water-soluble polymer. Thus, the liquid component to be used as a dispersion medium for the electrode material mixture in the primary kneading and the secondary kneading is required to include at least water. Although an admixture of water and a liquid component other than water can be used as a dispersion medium, in view of decreasing an environmental burden and the like, it is preferable that water is used alone as a dispersion medium. A liquid component including 90 wt % or more of water, for example, is also preferably used as a dispersion medium.

A water-soluble polymer dissolves in water to give a viscous aqueous solution. As the water-soluble polymer, polyethylene oxide (PEO), polyvinyl alcohol (PVA), methylcellulose, and a denatured methylcellulose can be mentioned, for example. Among these, a denatured methylcellulose, especially carboxymethyl cellulose (CMC) is used preferably, in particular, since it can give an appropriate viscosity to a slurry, and is excellent in dispersion state in the slurry. A kind of water-soluble polymer may be used alone, or plural kinds of water-soluble polymers may be used in combination.

The amount of a thickener to be used is not to be limited particularly, but in view of giving the slurry an appropriate viscosity and obtaining an electrode plate having high capacity, generally, 0.1 to 1.5 parts by weight of thickener per 100 parts by weight of an active material is used.

However, in view of embodying further excellent battery performance, a thickener in an amount of 0.2 to 0.8 parts by weight per 100 parts by weight of an active material is used preferably, and more preferably, 0.2 to 0.6 parts by weight of thickener per 100 parts by weight of an active material is used. When the amount of the thickener is too small, it becomes difficult to give an appropriate viscosity to a slurry, and a precipitation of a solid is likely to occur. Also, when the amount of the thickener is too large, there may be a case where an electrode plate with high capacity can not be obtained.

The conductive material includes at least a carbon material. Although an admixture of a carbon material and a material other than the carbon material may be used for the conductive material, it is preferable that the 90 to 100 wt % of the conductive material is a carbon material. As for the carbon material, carbon blacks such as acetylene black (AB), ketjen black, channel black, furnace black, lamp black and thermal black, and various graphites may be preferably used. These carbon materials may be used alone, or in combination of two or more kinds.

When the amount of the thickener is not specified, a conductive material in an amount of 1 to 5 parts by weight per 100 parts by weight of an active material is appropriate. When the amount of the conductive material is too small, it becomes difficult to form sufficient conductive network, and discharge performance may decrease. When the amount of the conductive material is too large, in addition to a decrease in capacity, a large amount of gas may be generated during storage in a high temperature, due to an increase in a contact surface area of the conductive material and the non-aqueous electrolyte. When an excessive amount of gas is generated, it may induce a deformation of a battery case, misoperation of a safety mechanism, and a decrease in capacity due to deformation of a positive electrode and a negative electrode.

On the other hand, based on the knowledge of inventors of the present invention, there is an interdependent relationship between an amount of a thickener and an amount of a conductive material. Specifically, it is preferable that a conductive material of 1 to 2.5 parts by weight per 100 parts by weight of the active material is used when a thickener of 0.2 to 0.8 parts by weight per 100 parts by weight of the active material is used, and it is further preferable that a conductive material of 1 to 2.2 parts by weight per 100 parts by weight of the active material is used.

A conductive material formed of a carbon material has unstable dispersion state in a liquid component including water and tends to re-coagulate, because it has a hydrophobic property. Thus, formation of a conductive network structure is likely to be prevented. On the other hand, based on the knowledge of the inventors of the present invention, since a water soluble polymer to be used as a thickener has a hydrophilic functional group, it works like a surfactant and has a function to stabilize a dispersion state of the conductive material, which is a hydrophobic material.

When the amount of a conductive material is 1 to 2.5 parts by weight and the amount of a thickener is 0.2 to 0.8 parts by weight per 100 parts by weight of the active material, the thickener can be made efficiently adsorbed on the conductive material, and the stabilizing effect for a dispersion state of the conductive material is increased. That is, a function of the thickener as a surfactant is effectively utilized. When the amount of the conductive material is more than 2.5 parts by weight, the amount of the thickener becomes insufficient for stabilizing a dispersion state of all the conductive material, and a part of the conductive material is thought to become re-coagulate. The coagulated conductive material makes little contribution to the formation of a conductive network, becoming a mere waste of space, thereby causing decrease in a capacity as a result. The unnecessary conductive material should be decreased, in view of decreasing a source for gas generation as well.

When 0.2 to 0.8 parts by weight of a thickener per 100 parts by weight of an active material, and 1 to 2.5 parts by weight of a conductive material per 100 parts by weight of an active material are used, it is particularly preferable that carboxymethyl cellulose having a functional group such as a carboxyl group is used as the thickener. This is because carboxymethyl cellulose has many functional groups among water-soluble polymers, and is highly functionable as a surfactant.

In view of giving an aqueous solution having an appropriate viscosity, it is preferable that a viscosity of an aqueous solution dissolving 1 wt % water-soluble polymer is 2.5 to 18 Pa·s at 25° C., and more preferably, 6 to 10 Pa·s at 25° C. When the viscosity of the aqueous solution dissolving 1 wt % water-soluble polymer is below 2.5 Pa·s, there may be a case where a viscosity of the mixture in the primary kneading is insufficient. Also, when the viscosity of the aqueous solution dissolving 1 wt % water-soluble polymer is over 18 Pa·s, a viscosity of the mixture in the primary kneading matter becomes excessively high, and a dispersion state of the electrode material mixture in the slurry decreases to some extent. Thus, it may be difficult to highly suppress a variation of the weight of the electrode material mixture slurry to be applied on a current collector in some case.

Additionally, when a viscosity of an aqueous solution dissolving 1 wt % water-soluble polymer is 2.5 to 18 Pa·s, the molecular of the water-soluble polymer is in an appropriate range for exerting its function as a surfactant. Thus, the water-soluble polymer within the above viscosity range has a higher function as a surfactant, and accelerates the dispersion of the conductive material while giving an appropriate viscosity to the electrode material mixture slurry. When the viscosity of the aqueous solution dissolving 1 wt % water-soluble polymer is below 2.5 Pa·s, the dispersion state of the conductive material is not sufficiently heightened, and fluidity of the slurry becomes excessively high, thereby causing an uneven application of the electrode material mixture slurry on the current collector. Also, when the viscosity of the aqueous solution dissolving 1 wt % water-soluble polymer is over 18 Pa·s as well, the dispersion state of the conductive material is not sufficiently heightened, and flowability of the slurry becomes low, thereby causing an uneven application of the electrode material mixture slurry on the current collector. Such uneven application will cause a degradation of battery performance.

Although any binder can be used in the present invention, it is preferable that a particulate binder be used. The particulate binder is preferably stably dispersed in water and the like in fine particles. Although it is preferable that a rubber particle is used for the particulate binder, it is not limited thereto. A kind of binder can be used alone, or a combination of two or more binders can be used.

For the particulate binder, it is preferable that rubber particles having an acrylonitrile unit, styrene-butadiene copolymer (SBR), denatured SBR, and the like are used, and more particularly, it is preferable that rubber particles an acrylonitrile unit is used. Rubber particles having a group with polarity such as an acrylonitrile unit is easily adsorbed on an active material, and able to heighten the binding property between the active material particles, and binding property between the active material and the current collector, thereby enabling a decrease in the amount of the binder to be used.

As examples of rubber particles having an acrylonitrile unit, a copolymer of acrylonitrile and acrylate, a copolymer of acrylonitrile and acrylic acid, a copolymer of acrylonitrile, acrylate, and acrylic acid, and the like can be mentioned. In terms of a balance of the rubber elasticity and binding property, a copolymer of acrylonitrile, acrylate, and acrylic acid is particularly preferable.

Other than the above, fluorocarbon polymers can be used as a binder, for example. It is preferable that the fluorocarbon polymer is dispersed stably in fine particles in water and the like. Polytetrafluoroethylene (PTFE), denatured PTFE, polyvinylidene fluoride (PVDF), denatured PVDF, a copolymer of tetrafluoroethylene and hexafluoropropylene (HFP) (PTFE-HFP) may be used as the fluorocarbon polymer.

Although the amount of a binder to be used is not particularly limited, generally, the amount is 0.1 to 3 parts by weight per 100 parts by weight of an active material, and it is preferable that the amount is 0.2 to 1.4 parts by weight per 100 parts by weight of an active material, and more preferably, the amount is 0.2 to 1.1 parts by weight per 100 parts by weight of an active material. When the amount of a binder is 1.4 parts by weight per 100 parts by weight of an active material or below, it becomes possible to obtain an electrode plate with extremely high capacity, while the dispersion state of the electrode material mixture in a slurry becomes more excellent. When the amount of the binder becomes over 1.4 parts by weight per 100 parts by weight of an active material, even though an electrode material mixture slurry with excellent dispersion state is obtained, higher capacity of an electrode plate can not be realized sufficiently. The amount of a binder is preferably less in terms of capacity, but when it becomes less than 0.2 parts by weight per 100 parts by weight of an active material, the binding property may become degraded, resulting in a decrease in yield rate.

It is preferable that a composite oxide of a transition metal and lithium is used as an active material. As for an active material, various composition oxides which have been reported may be used. For example, the following can be used: an oxide of lithium and cobalt such as lithium cobaltate; an eutectic oxide in which a part of cobalt in lithium cobaltate is replaced with aluminum, magnesium, or the like; an oxide of nickel and lithium such as lithium nickelate; an eutectic oxide in which a part of nickel in lithium nickelate is replaced with cobalt or the like; an oxide of lithium and manganese; and an eutectic oxide in which a part of manganese in lithium manganate is replaced with nickel, cobalt, or the like. The composite oxide can be used alone or in combination of various kinds.

When a particulate binder is used, selection of an active material should be done by considering the following points. Since one of the objectives of the present invention is to obtain an electrode plate with high capacity, a particle binder which enables higher binding property with less amount compared with conventional ones is used. On the other hand, binders other than a particle binder, polytetrafluoroethylene (PTFE) for example, has functions to suppress an excessive release of lithium ion from the active material at the time of overcharge, and to inhibit destruction of crystal structure and heat evolution. Such functions are due to works of PTFE to cover a surface of the active material, decreasing a region of the active material contributing to charge/discharge reaction. However, when an amount of a binder is to be decreased than ever by using a particle binder, there is a concern that a level of safety is to be lowered, because a coverage area by the binder on a surface of the active material will be decreased, and an amount of heat evolved at the time of overcharge will increase.

In view of sweeping away the above concern and securing higher level of safety, an active material with a specific surface area of 0.2 to 0.8 $m^2/g$ measured by BET method is preferably used in the present invention. By suppressing the specific surface area to 0.2 to 0.8 $m^2/g$, instead of covering the surface of the active material by a binder, an excellent charge/discharge performance can be secured, and the level of safety can be prevented from lowering at the time of overcharge.

When the specific surface area measured by BET method is over 0.8 $m^2/g$, the amount of heat generated from a battery in an overcharged state approaches the upper limit level under which a safety can be secured. In terms of maintaining the safety of the battery in an overcharged state to a higher degree, it is more preferable that the specific surface area is set to become not more than 0.5 $m^2/g$. On the other hand, when the specific surface area of the active material measured by BET method becomes below 0.2 $m^2/g$, heating of the battery in an overcharged state is securely suppressed, but a transfer resistance of lithium ion will increase due to a decrease in an reacting area for charging/discharging of the active material. Therefore, a discharging capacity at the time of high rate discharge may be decreased.

When preparing an electrode plate for a positive electrode, an electrode material mixture slurry prepared is applied on a current collector, and then dried. Then, an electrode material mixture layer is formed by conducting pressing or the like of the dried coating. In the present invention, it is preferable that a porosity in the electrode material mixture layer is 18 to 28%, and more preferably, 18 to 25%. Although any method to control the porosity of the electrode material mixture layer can be used, generally, pressing with controlled pressure is conducted to the dried coating.

Although battery performance is satisfactory even when the porosity is below 18%, in the case of an electrode group including a positive electrode having an electrode material mixture layer with a porosity of below 18%, a productivity is greatly decreased because the impregnation of the electrode group with an electrolyte becomes time-consuming. On the other hand, when a porosity of the electrode material mixture layer is over 28%, cycle life of the battery may decrease, even to some degree.

The porosity of an electrode material mixture layer can be obtained by the following method.

First, a theoretical volume A of the electrode material mixture layer is obtained from the composition of the electrode material mixture and specific gravities of the materials forming the electrode material mixture. The theoretical volume A is equivalent to a volume of the electrode material mixture layer with 0% porosity. A measured volume B of the electrode material mixture layer is obtained from the apparent size thereof. The porosity P is obtained from the following formula.

$$P(\%) = \{(B-A)/B\} \times 100$$

In an electrode group including a positive electrode and a negative electrode wound with a separator interposed therebetween, it is desired that a safety mechanism be formed to cope with the problems such as an internal short circuit and the like, by forming an exposed part of the positive electrode current collector carrying no electrode material mixture layer on both sides thereof in the outermost perimeter. Thus, in a preferred embodiment, at least one exposed part per one positive electrode is formed. On both sides of the exposed part, no electrode material mixture layer is supported and a lead is not connected thereto. The exposed part as a safety mechanism is disposed at the outermost perimeter of the electrode group.

When an exposed part not supporting the electrode material mixture layer is provided, there exists a boundary between the dried coating and the exposed part on the current collector at the time of conducting pressing and the like. In such a case, usually, it is difficult to obtain an electrode material mixture layer with 18 to 28% porosity by pressing the dried coating without fracture of the current collector at the boundary to occur. However, according to the present invention, the dried coating of the electrode material mixture which is an intermediate product has an excellent elasticity, since a particulate binder is distributed quite uniformly in the dried coating. Therefore, a fracture and the like of the current collector is suppressed even when a porosity of the electrode material mixture layer is controlled to become 18 to 28% by pressing the dried coating with a high pressure. However, when the porosity of the electrode material mixture layer is controlled to be below 18%, a fracture of the current collector at the boundary is likely to occur, due to an excessive stress applied to the boundary between the dried coating and the exposed part on the current collector at the time of pressing the dried coating.

Thus, according to the present invention, even when an exposed part on a current collector is provided at the outermost perimeter of an electrode group, an electrode plate with high capacity can be obtained, and a higher battery capacity can be aimed without causing problems such as a fracture of the current collector.

Other method for providing an exposed part not supporting the electrode material mixture layer on a current collector can be adopted. For example, a part of the electrode material mixture layer obtained by pressing may be removed by mechanical separation. However, on top of being inefficient, such method is likely to cause a damage to the electrode plate as well. As for other efficient methods, an intermittent application of the electrode material mixture slurry may be conducted to leave an exposed part to a specific position on a current collector, or an application of the electrode material mixture slurry and pressing may be conducted after protecting a specific position on the current collector by a masking tape or the like. The intermittent application can be conducted by a die coating or a comma reverse coating, for example.

A non-aqueous secondary battery comprises a positive electrode, a negative electrode, a separator interposed between these electrodes, and a non-aqueous electrolyte. A method for manufacturing an electrode plate for a negative electrode is not particularly limited, and any conventional method can be used. A known negative electrode active material can be used without any limitation. For example, a carbon material of various natural graphites, artificial graphites and the like, a composite silicon material such as a silicide, and various alloy materials can be used.

As for a binder for an electrode plate of a negative electrode, fluorocarbon resin, rubber particles, and polyolefin particles are preferably used also. For the fluorocarbon resin, PVDF, denatured PVDF and the like can be mentioned. For rubber particles, SBR, denatured SBR and the like can be mentioned. These can be used alone, and can be used in combinations of two or more. In view of improving acceptance of lithium ion by the negative electrode, it is preferable that rubber particles are used. When rubber particles are used, it is preferable that a cellulosic resin such as CMC is used in combination as a thickener.

As for a non-aqueous electrolyte, a non-aqueous solvent in which a solute is dissolved is used. For the solute, lithium salts such as $LiPF_6$, $LiBF_4$, and the like are used preferably, but it is not limited thereto. For the non-aqueous solvent, although carbonic acid esters such as ethylene carbonate (EC), propylene carbonate (PC), dimethyl carbonate (DMC), diethyl carbonate (DEC), methyl ethyl carbonate (MEC), and the like are preferably used, it is not limited thereto. It is preferable that these solvents are used in combination of two or more.

It is preferable that an additive for forming an excellent coating on a positive electrode or a negative electrode is added to the non-aqueous electrolyte. Such coating is to improve safety of a battery at the time of overcharge. For the additive, vinylen carbonate (VC), vinyl ethylene carbonate (VEC), cyclohexyl benzene (CHB), denatured VC and CHB, and the like may be used.

Although a separator is not particularly limited, porous film formed of polyolefine resin such as polyethylene, polypropylene and the like may be used. The porous film is generally a single layer film formed of one polyolefine, or a composite film formed of two or more polyolefines. Although a thickness of the separator is not particularly limited, it is preferable that the thickness is 10 to 25 µm.

Although the present invention is described in detail with reference to examples in the following, the present invention is not limited thereto.

EXAMPLE 1

An electrode plate for a positive electrode was prepared according to the flow chart illustrated in FIG. 1.

(i) Preparation of Electrode Plate for Positive Electrode

<Primary Kneading>

A lithium cobaltate having a specific surface area of 1.4 $m^2/g$ measured by BET method was used as an active material. The lithium cobaltate was obtained by calcining a mixture of lithium carbonate and cobalt tetroxide for 4.5 hours at 750° C., and then calcining the mixture for 7.5 hours at 900° C., crushing the sintered mixture, and then sieving.

A primary kneaded matter with the solid content of 80 wt % was obtained by mixing 100 parts by weight of the active material, 4 parts by weight of acetylene black (AB) as a conductive material, and 0.4 parts by weight of carboxymethyl cellulose (CMC) in a powder state, and adding a predetermined amount of water to the mixture, and then kneading the mixture with a double arm kneader.

"CELLOGEN 4H" of DAI-ICHI KOGYO SEIYAKU CO., LTD. was used as the CMC. An aqueous solution dissolving 1 wtt of this CMC had a viscosity of 1.7 Pa·s at an ambient temperature of 25° C. B-type viscometer was used for the measurement of viscosity.

The preparing method for CMC aqueous solution used in the measurement of viscosity is described in detail here.

The measurement was conducted based on the following method, since a viscosity of a CMC solution heavily depends on a method of stirring. First, 2.3 g of CMC was put into a capped Erlenmeyer flask with an internal volume of 300 ml, distilled water in an amount of 200 ml was added thereto, and then the flask was shaken intensely. Next, the content of the Erlenmeyer flask was left for 18 to 20 hours. Afterwards, distilled water was added to the content of the flask to obtain an aqueous solution dissolving 1 wt % CMC, and then the solution was stirred for 5 minutes with a magnetic stirrer to dissolve the CMC completely. A viscosity of the aqueous solution thus obtained was measured by the B-type viscometer at an ambient temperature of 25° C.

<Secondary Kneading>

Next, 2.4 parts by weight of a binder per 100 parts by weight of the active material and a certain amount of water were added to the primary kneaded matter, half the amount at a time, and stirred with the double arm kneader to obtain a secondary kneaded matter of 70 wt % solid content, i.e., an electrode material mixture slurry.

For the binder, a copolymer of polytetrafluoroethylene (PTFE) and hexafluoropropylene (HFP) was used (PTFE-HFP). A dispersion of PTFE-HFP stably dispersed in water in a form of fine particles was used. The content of PTFE-HFP in the aqueous dispersion was 60 wt %.

<Applying Step>

The obtained electrode material mixture slurry was left to stand and stored for 24 hours, and applied on both sides of a current collector comprising an aluminum foil with a 15 μm thickness, and dried to form a dried coating so that a total thickness of the electrode material mixture on both sides and the current collector became 240 μm. Then, the dried coating was pressed so that the total thickness became 160 μm, to give a positive electrode material mixture layer (porosity 31%). Afterwards, the electrode plate comprising the current collector supporting the positive electrode material mixture layer on both sides thereof was slit to have a 56 mm width, to obtain a positive electrode.

(ii) Preparation of Electrode Plate for Negative Electrode

To a mixture of 100 parts by weight of an active material, 1 part by weight of a denatured SBR as a binder, 1 part by weight of CMC as a thickener, a predetermined amount of water was added, and kneaded by a double arm kneader to prepare an electrode material mixture slurry of 50 wt % solid content.

Herein, an artificial graphite, "MAG-D" manufactured by Hitachi Chemical Co., Ltd., was used as the active material. For the binder, "BM-400B" manufactured by Zeon Corporation (40 wt % content of denatured SBR) was used.

For CMC, the same CMC used for the positive electrode was used. Here, an aqueous solution dissolving 2 wt % CMC was prepared, and the aqueous solution of 50 parts by weight per 100 parts by weight of the active material was used.

The electrode material mixture slurry thus obtained was applied on both sides of a current collector comprising a copper foil of 10 μm thickness and dried, to form a dried coating with a thickness of approximately 250 μm in total including both sides. Then, the dried coating was pressed to have a total thickness of 180 μm, to obtain a negative electrode material mixture layer. Afterwards, the electrode plate comprising the current collector supporting the negative electrode material mixture layer on both sides thereof was slit to have a 59 mm width, thereby obtaining a negative electrode.

(iii) Preparation of Non-Aqueous Electrolyte

To a solvent mixture of ethylene carbonate (EC), dimethyl carbonate (DMC), and methyl ethyl carbonate (MEC) with a volume ratio of 3:3:2 in an amount of 100 parts by weight, 3 parts by weight of vinylen carbonate (VC) was added, then $LiPF_6$ was dissolved therein at a concentration of 1 mol/L to obtain a non-aqueous electrolyte.

(iv) Assembly of Battery

The positive electrode and the negative electrode were wound with interposing a separator comprising polyethylene porous film with a thickness of 20 μm (#2320 manufactured by Celgard K.K.) between them, to form an electrode group. The electrode group thus obtained was inserted in a battery case of iron, inner side of which was plated with nickel. The battery case was sealed after 5.5 g of the non-aqueous electrolyte was injected into the case. The battery thus obtained was a lithium ion secondary battery of cylindrical shape 18650, and had a nominal capacity of 2000 mAh.

COMPARATIVE EXAMPLE 1

Figure 2:
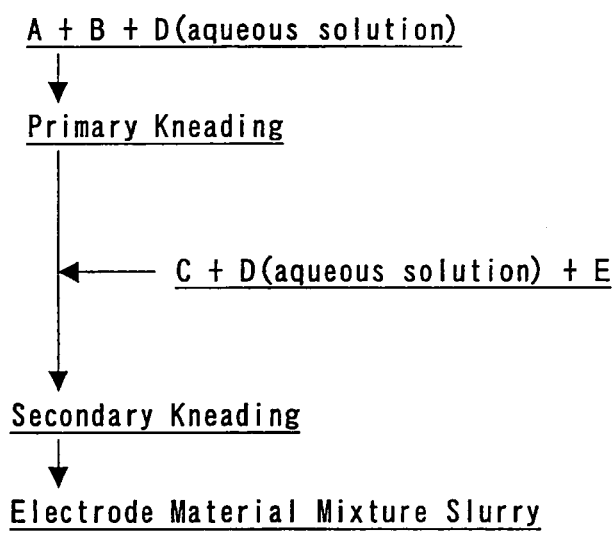
FIG. 2 is a flow chart illustrating the steps of preparing a positive electrode material mixture slurry of the comparative example 1.

An electrode plate of a positive electrode was prepared according to the flow chart shown in FIG. 2.

A thickener CMC was dissolved in water in advance by using a homogenizer, to prepare an aqueous solution dissolving 2 wt % of CMC. The same CMC used in Example 1 was used. An electrode plate of a positive electrode was prepared in the same manner as in Example 1, except that the aqueous solution was used so that the amount of CMC became 0.4 parts by weight per 100 parts by weight of the active material. The porosity of the positive electrode material mixture layer was 31%. Then, a lithium ion secondary battery was prepared in the same manner as in Example 1, by using the electrode plate for a positive electrode thus obtained.

COMPARATIVE EXAMPLE 2

Figure 3:
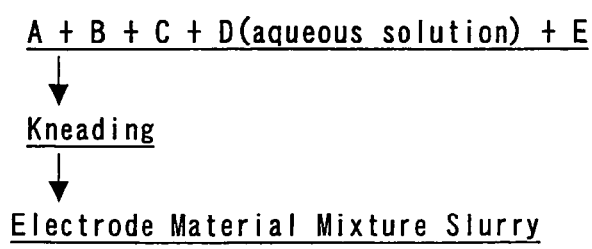
FIG. 3 is a flow chart illustrating the steps of preparing a positive electrode material mixture slurry of the comparative example 2.

An electrode plate of a positive electrode was prepared according to the flow chart shown in FIG. 3.

In this comparative example as well, the thickener CMC was dissolved in water in advance by using a homogenizer, to prepare an aqueous solution dissolving 2 wt % of CMC. The same CMC used in Example 1 was used. The CMC aqueous solution, and the water dispersion of PTFE-HFP as a binder were simultaneously admixed at once so that the amount of CMC became 0.4 parts by weight and the amount of PTFE-HFP became 2.4 parts by weight, per 100 parts by weight of the active material, respectively. That is, an electrode material mixture slurry was prepared by kneading all the materials at once. An electrode plate of a positive electrode was prepared in the same manner as in Example 1, except that the electrode material mixture slurry thus obtained was used. The porosity of the positive electrode material mixture layer was 31%. Then, a lithium ion secondary battery was prepared in the same manner as in Example 1, using the electrode plate of a positive electrode thus obtained.

(Evaluation 1)

The electrode plate of a positive electrode was evaluated by the method shown below. The results are shown in Table 1.

[Volume Resistivity of Coating]

The electrode material mixture slurry right after the kneading was applied to a film of polyethylene terephthalate (PET), and a volume resistivity of the coating was measured by four point probe method after drying of the coating. Further, the electrode material mixture slurry right after the kneading was left for 24 hours, a dried coating was formed in the same manner as above by using the electrode material mixture slurry thus left, and a volume resistivity was measured.

[Variations in Weight]

The electrode material mixture slurry was applied on a current collector comprising an aluminum foil of 15 μm thickness by die-coating, and at the time of drying, variations in weight of the electrode material mixture slurry applied on the current collector were measured by beta-ray weight meter which simply measures weight by reflection of beta-ray. Herein, a region of 2000 m in a longitudinal direction of the current collector was continuously measured, while beta-ray was being scanned in a widthwise direction repeatedly of the current collector.

TABLE 1

|  | Volume resistivity of coating using electrode material mixture slurry right after kneading (Ω · cm) | Volume resistivity of coating using electrode material mixture slurry after being left for 24 hours (Ω · cm) | Variations in weight of electrode material mixture applied to current collector (%) |
| --- | --- | --- | --- |
| Ex. 1 | 15 | 20 | ±0.5 |
| Com Ex. 1 | 14 | 46 | ±1.8 |
| Com Ex. 2 | 25 | 107 | ±2.2 |

Evaluation results of Table 1 are described in the following.

In manufacturing steps of an electrode plate of a positive electrode, in the case where an electrode material mixture slurry was prepared by admixing the thickener and the binder in separate steps, and the thickener was used in a powder state (Example 1), the volume resistivity variation with time could be suppressed. This is probably because a coagulation of the conductive material in the electrode material mixture slurry was being suppressed. Also, in Example 1, variations in weight depending upon the position on the current collector of the electrode plate were less.

On the other hand, in manufacturing steps of an electrode plate of a positive electrode, in the case where an electrode material mixture slurry was prepared by admixing the thickener and the binder in separate steps, but the thickener was used in an aqueous-solution state (Comparative Example 1), the volume resistivity variation with time was more, and even the variation in weight of the electrode material mixture depending upon the position on the current collector of the electrode plate was more. This is probably because a sufficient shearing force could not be applied to the conductive material and the like at the primary kneading, in addition to the fact that the thickening effect of CMC was partially damaged at the time of preparing CMC solution, and enough thickening effect could not be obtained.

Also, when an electrode material mixture slurry was prepared by kneading the active material, the conductive material, the thickener, and the binder all at once in manufacturing an electrode plate of a positive electrode (Comparative Example 2), the volume resistivity variation with time and variation in weight of the electrode material mixture depending upon the position on the current collector of the electrode plate became even greater. This is probably because a sufficient shearing force could not be given to the conductive material and the like, and the dispersion states of the conductive material and the binder in the electrode material mixture slurry were deteriorated due to the mixing of the binder and the thickener all at once, in addition to a partial damage to the thickening effect of CMC at the time of preparing the CMC aqueous solution.

(Evaluation 2)

Next, the lithium ion secondary battery thus obtained was evaluated with a method shown below. The results are shown in Table 2.

[Variations in Battery Capacity]

Charge/discharge was conducted twice as a run-in under the charge/discharge condition X below for conforming products manufactured without separation of the electrode material mixture and without crack.

<Charge/Discharge Condition X>

Constant current charge: 1400 mA

End-of-charge voltage: 4.1 V

Constant current discharge: 1400 mA

End-of-discharge voltage: 3 V

A battery which completed the run-in charge/discharge was stored in the charged state for 7 days at 45° C. ambient temperature. The charge was conducted with the condition Y below.

<Charge Condition Y>

Constant current charge: 1400 mA

End-of-charge voltage: 4.2 V

Constant voltage charge: 4.2 V

End-of-charge current: 100 mA

Twenty batteries after the storage were measured to check the variations in capacity. The results are shown in Table 2.

[Capacity Retention Rate after 200 Cycles]

The run-in charge/discharge same as the above was conducted twice for the conforming product, and stored for 7 days at 45° C. ambient temperature. Charge/discharge cycle was conducted 200 times under charge/discharge condition Z below subsequently. Then, a rate of discharge capacity of $200^{th}$ cycle against $1^{st}$ cycle was obtained as a capacity retention rate.

<Charge/Discharge Condition Z>
Constant current charge: 1400 mA
End-of-charge voltage: 4.2 V
Constant voltage charge: 4.2 V
End-of-charge current: 100 mA
Constant current discharge: 2000 mA
End-of-discharge voltage: 3 V

TABLE 2

|  | Variations in battery capacity (%) | Capacity retention rate after 200 cycles (%) |
| --- | --- | --- |
| Ex. 1 | ±0.7 | 90 |
| Com Ex. 1 | ±2.7 | 83 |
| Com Ex. 2 | ±3.4 | 78 |

The results of Table 2 are explained below.

When an electrode material mixture slurry had been prepared by admixing a thickener in a powder state and a binder in separate steps (Example 1), variations in the battery capacity were less, and the capacity retention rate after 200 cycles was excellent, relating to the suppression of variations of volume resistivity with time and the like.

On the other hand, when an electrode material mixture slurry had been prepared by admixing a thickener and a binder in separate steps, but the thickener had been admixed in an aqueous-solution state (Comparative Example 1), variations in battery capacity was more, and capacity retention rate after 200 cycles was low.

Also, when an electrode material mixture slurry had been prepared by kneading an active material, a conductive material, a thickener, and a binder all at once was used in a step of manufacturing an electrode plate of a positive electrode (Comparative Example 2), variations in battery capacity was even more, and capacity retention rate after 200 cycles became drastically low.

It is assumed that the capacity retention rates after 200 cycles were decreased in comparative examples 1 and 2 based on the below. When an electrode plate with greater variations in weight of electrode material mixture depending upon the position on the current collector is used, lithium ion that is not accepted by a negative electrode active material becomes more prone to deposit as lithium metal, due to an excess of local load of the negative electrode material.

From the above result, in order to obtain a non-aqueous secondary battery with excellent cycle life, it can be concluded that a method of manufacturing an electrode plate according to the present invention comprising the primary kneading and the secondary kneading, that is, a method in which a thickener in a powder state is used in the primary kneading is effective.

EXAMPLE 2

An electrode plate of a positive electrode was made in the same manner as in Example 1 except for the following changes.

In this example, 2 parts by weight of rubber particles comprising copolymer of 2-ethylhexyl acrylate, acrylic acid, and acrylonitrile (2-EHA-AA-AN) per 100 parts by weight of the active material was used instead of using 2.4 parts by weight of PTFE-HFP per 100 parts by weight of the active material as a binder in the secondary kneading. A dispersion of 2-EHA-AA-AN stably dispersed in water in a form of fine particles was used. The 2-EHA-AA-AN content in the water dispersion was 40 wt %.

(Evaluation 3)

The electrode plate thus obtained and the electrode plate of Example 1 were evaluated comparatively with a method shown below. The results are shown in Table 3.

[Separation of Positive Electrode Material Mixture]

A positive electrode with a certain width was cut out from the electrode plate, and the positive electrode, a negative electrode, and a separator were wound in the same manner as in Example 1 (this condition is called wound around product in process). Then, the winding was loosen for a time, and conditions of the positive electrode material mixture in proximity of the core were observed visually. The conditions of 20 wound around products in process in proximity of the core were observed for Examples 1 and 2, respectively. The number of the wound around product in which the positive electrode material mixture was separated or the electrode material mixture layer was cracked was obtained.

TABLE 3

|  | Separation of electrode material mixture (piece/20 pieces) |
| --- | --- |
| Example 2 | 0 |
| Example 1 | 5 |

The evaluation results of Table 3 are explained below.

When rubber particles of 2-EHA, AA, and AN were used as a binder (Example 2), separation of the positive electrode material mixture was more suppressed than Example 1 in which PTEF-HFP was used as a binder. Moreover, an amount of the binder per 100 parts by weight of the active material was less in Example 2, than in Example 1.

Such results were obtained probably due to a difference in mechanism of binding effect. PTFE-HFP is inherently low in binding property, and the binding property is secured by molecular entanglement. As opposed to this, in rubber particles such as 2-EHA-AA-AN, adhesive component on the surface layer exerts the binding property. Rubber particles are able to adhere particles of active material by points; therefore, the binding property is secured even by decreasing the usage amount.

As is clear from the above, a non-aqueous secondary battery with excellent cycle life, and high capacity can be obtained by admixing a thickener in the primary kneading in a powder state, and using rubber particles as a binder, in a method of manufacturing an electrode plate comprising the primary kneading and the secondary kneading. That is, according to the present invention, a decrease in an amount of the materials other than an active material is brought about by using a thickener in a powder state in the primary kneading. Also a decrease in an amount of the binder is brought about by using rubber particles. These decreases contribute to a higher capacity of an electrode plate synergistically.

EXAMPLE 3

An electrode plate of a positive electrode was made in the same manner as in Example 2 except for the following changes.

In this example, 0.1 parts by weight, 0.2 parts by weight, 0.8 parts by weight, 1.1 parts by weight, and 1.4 parts by weight of 2-EHA-AA-AN per 100 parts by weight of the active material were used instead of using 2 parts by weight of 2-EHA-AA-AN per 100 parts by weight of the active material as a binder in the secondary kneading, to obtain electrode plates 1, 2, 3, 4, and 5, respectively. Then, lithium ion secondary batteries 1,2,3,4, and 5 were made by using the electrode plates 1, 2, 3, 4, and 5, respectively in the same manner as in Example 1.

(Evaluation 4)

The electrode plates 1 to 5 thus obtained were evaluated for [Separation of Positive Electrode Material Mixture] in the same manner as in (Evaluation 3). Also, battery capacities of the batteries 1 to 5 thus obtained and battery capacities of Example 2 were comparatively evaluated by the method shown below. The results are shown in Table 4.

[Battery Capacity]

Charge/discharge was conducted twice as a run-in under the same condition as the charge/discharge condition X in (Evaluation 2) for conforming products manufactured without separation of the electrode material mixture, and without crack.

The batteries completed the run-in charge/discharge were stored in a charged state for 7 days at 45° C. ambient temperature. The charge was conducted under the same condition as the condition Y in (Evaluation 2).

Then, the batteries after the storage were charged/discharged under the same condition as the charge/discharge condition Z in (Evaluation 2).

The battery capacity was obtained from discharge capacity.

TABLE 4

|  |  | Amount of binder (parts by weight) | Separation of electrode material mixture (piece/20 pieces) | Battery capacity (mAh) |
|---|---|---|---|---|
| Ex. 3 | Battery 1 | 0.1 | 4 | 2322 |
|  | Battery 2 | 0.2 | 1 | 2309 |
|  | Battery 3 | 0.8 | 0 | 2288 |
|  | Battery 4 | 1.1 | 0 | 2275 |
|  | Battery 5 | 1.4 | 0 | 2251 |
| Ex. 2 |  | 2.0 | 0 | 2217 |

The evaluation results of Table 4 are explained below.

When an amount of the binder was 0.1 parts by weight per 100 parts by weight of the active material (battery 1), separation of the electrode material mixture from the current collector occurred, though the occurrence was lower than Example 1. On the other hand, when an amount of the binder was 2 parts by weight per 100 parts by weight of the active material (battery 2), there was a comparatively remarkable decrease in battery capacity. The prominence in decrease of battery capacity was probably due to a decrease in the content ratio of the active material in the positive electrode material mixture (design capacity will be decreased), while a decrease in discharge capacity was accelerated by an increase in resistance component for battery reaction. When an amount of the binder was 1.4 parts by weight per 100 parts by weight of the active material (battery 5), although battery capacity became smaller compared with batteries 1 to 4, sufficiently higher capacity compared with conventional ones was obtained.

Also, it is clear from Table 4 that the amount of the binder is preferably 0.2 to 1.4 parts by weight per 100 parts by weight of an active material, and further preferable that the amount of the binder is 0.2 to 1.1 parts by weight per 100 parts by weight of an active material, in order to obtain a battery with high capacity, by making full use of the method according to the present invention.

EXAMPLE 4

An electrode plate of a positive electrode was made in the same manner as in Example 3 except for the following changes.

In this example, 0.8 parts by weight of 2-EHA-AA-AN per 100 parts by weight of the active material was used as a binder, in the same manner as battery 3 of Example 3, in the secondary kneading.

In the primary kneading, 3.0 parts by weight, 2.5 parts by weight, 2.2 parts by weight, 2.0 parts by weight, 1.0 parts by weight, and 0.8 parts by weight of acetylene black (AB) per 100 parts by weight of the active material were used to obtain electrode plates 6, 7, 8, 9, 10, and 11, respectively.

Then, lithium ion secondary batteries 6, 7, 8, 9, 10, and 11 were made by using the electrode plates 6, 7, 8, 9, 10, and 11, respectively in the same manner as in Example 1.

(Evaluation 5)

Then, the batteries 6 to 11 thus obtained were evaluated for [Capacity Retention Rate after 200 Cycles] in the same manner as in (Evaluation 2). Also, the amount of gas generated at the time of storing batteries was evaluated by the method shown below. The results are shown in Table 5.

[Amount of Gas Generated at the Time of Storing]

Charge/discharge was conducted twice as a run-in under the same condition as the charge/discharge condition X in (Evaluation 2) for the batteries.

The batteries completed the charge/discharge as a run-in were stored for 7 days at 45° C. ambient temperature, in a charged state. The charge was conducted under the same condition as the charge conditions Y in (Evaluation 2).

Further, the batteries were stored for 20 days at 60° C. ambient temperature. Then, the amounts of gas generated in the batteries were measured by a gas chromatography afterwards.

TABLE 5

|  |  | Amount of conductive material (parts by weight) | Capacity retention rate after 200 cycles (%) | Amount of gas generated (ml) |
|---|---|---|---|---|
| Ex. 4 | Battery 6 | 3.0 | 89 | 5.5 |
|  | Battery 7 | 2.5 | 89 | 3.9 |
|  | Battery 8 | 2.2 | 88 | 3.6 |
|  | Battery 9 | 2.0 | 87 | 3.4 |
|  | Battery 10 | 1.0 | 86 | 3.3 |
|  | Battery 11 | 0.8 | 77 | 3.2 |

The evaluation results of Table 5 are explained below.

When the amount of the conductive material was 3.0 parts by weight per 100 parts by weight of an active material (battery 6), the amount of gas generated was notably increased when stored at 60° C. This was probably due to an increase in reaction area of the conductive material and the non-aqueous electrolyte, due to a decrease in the amount of the binder to 0.8 parts by weight per 100 parts by weight of the active material.

When an amount of the conductive material is 0.8 parts by weight per 100 parts by weight of the active material (battery 11), capacity retention rate after 200 cycles showed prominent decrease. This is probably due to a partial facture of the conductive network structure of conductive material, based on expansion and contraction of the positive electrode while charging/discharging, leading to a drastic decrease in electron conductivity of the positive electrode.

When an amount of the conductive material was not less than 1 part by weight to not more than 2.5 parts by weight per 100 parts by weight of the active material (batteries 7 to 10), capacity retention rate after 200 cycles was all excellent, and amount of gas generated was low. From this result, it becomes clear that a positive electrode maintains excellent electron conductivity, when an amount of the conductive material is not less than 1 part by weight per 100 parts by weight of an active material, even a conductive network structure is partially fractured. Also, it is clear that when an amount of the conductive material is not more than 2.5 parts by weight, or preferably not more than 2.2 parts by weight per 100 parts by weight of an active material, generation of gas in a battery can be suppressed quite effectively at the time of storing in high temperature.

EXAMPLE 5

An electrode plate of a positive electrode was made in the same manner as in Example 4 except for the following changes.

Acetylene black (AB) in an amount of 2.5 parts by weight per 100 parts by weight of the active material was used as a conductive material in the primary kneading, and 0.1 parts by weight, 0.2 parts by weight, 0.8 parts by weight, 1.4 parts by weight, and 2.0 parts by weight of 2-EHA-AA-AN per 100 parts by weight of the active material were used as a binder in the secondary kneading, as in the battery 7 of Example 4, to obtain electrode plates 12, 13, 14, 15, and 16, respectively.

Then, acetylene black (AB) in an amount of 1.0 parts by weight per 100 parts by weight of the active material was used as a conductive material in the primary kneading, and 0.1 parts by weight, 0.2 parts by weight, 0.8 parts by weight, 1.4 parts by weight, and 2.0 parts by weight of 2-EHA-AA-AN per 100 parts by weight of the active material were used as a binder in the secondary kneading, as in the battery 10 of Example 4, to obtain electrode plates 17, 18, 19, 20, and 21, respectively.

Then, acetylene black (AB) in an amount of 2.0 parts by weight per 100 parts by weight of the active material was used as a conductive material, in the primary kneading, and 0.1 parts by weight, 0.2 parts by weight, 0.8 parts by weight, 1.4 parts by weight, and 2.0 parts by weight of 2-EHA-AA-AN per 100 parts by weight of the active material were used as a binder in the secondary kneading, as in the battery 9 of Example 4, to obtain electrode plates 22, 23, 24, 25, and 26, respectively.

Then, lithium ion secondary batteries 12 to 26 were made by using the electrode plates 12 to 26 thus obtained in the same manner as in Example 1.

(Evaluation 6)

The batteries 12 to 26 thus obtained were evaluated for [Separation of Positive Electrode Material Mixture] in the same manner as in (Evaluation 3). Also, for the batteries 12 to 26 thus obtained, [Capacity Retention Rate after 200 Cycles] was evaluated in the same manner as in (Evaluation 2), and [Amount of Gas Generated at the time of Storing] was evaluated in the same manner as in (Evaluation 5). The results are shown in Table 6.

TABLE 6

| | | Amount of conductive material (parts by weight) | Amount of binder (parts by weight) | Separation of electrode material mixture (piece/ 20 pieces) | Capacity retention rate after 200 cycles (%) | Amount of gas generated at the time of storing (ml) |
|---|---|---|---|---|---|---|
| Ex. 5 | Battery 12 | 2.5 | 0.1 | 5 | 91 | 6.8 |
| | Battery 13 | 2.5 | 0.2 | 0 | 90 | 4.1 |
| | Battery 14 | 2.5 | 0.8 | 0 | 89 | 3.9 |
| | Battery 15 | 2.5 | 1.4 | 0 | 87 | 3.6 |
| | Battery 16 | 2.5 | 2.0 | 0 | 79 | 3.3 |
| | Battery 17 | 1.0 | 0.1 | 3 | 88 | 3.5 |
| | Battery 18 | 1.0 | 0.2 | 0 | 87 | 3.4 |
| | Battery 19 | 1.0 | 0.8 | 0 | 85 | 3.2 |
| | Battery 20 | 1.0 | 1.4 | 0 | 84 | 3.0 |
| | Battery 21 | 1.0 | 2.0 | 0 | 76 | 2.7 |
| | Battery 22 | 2.0 | 0.1 | 4 | 91 | 5.7 |
| | Battery 23 | 2.0 | 0.2 | 0 | 89 | 3.9 |
| | Battery 24 | 2.0 | 0.8 | 0 | 88 | 3.6 |
| | Battery 25 | 2.0 | 1.4 | 0 | 86 | 3.4 |
| | Battery 26 | 2.0 | 2.0 | 0 | 79 | 3.2 |

The evaluation results of Table 6 are explained below.

When the amount of the conductive material was small, the capacity retention rate after 200 cycles lowered, but the amount of gas tended to decrease. On the other hand, when the amount of the binder was small, the capacity retention rate after 200 cycles improved, but the amount of gas tended to increase.

When the amount of the binder was 0.1 parts by weight per 100 parts by weight of the active material, regardless of the amount of the conductive material, there were separations of the positive electrode material mixture from the current collector, and especially when the amount of the conductive material was 2.5 parts by weight per 100 parts by weight of the active material, the amount of gas generated increased prominently.

On the other hand, when the amount of the binder was 2.0 parts by weight per 100 parts by weight of the active material, the capacity retention rate after 200 cycles lowered drastically. This was probably due to a drastic decrease in the electron conductivity of the positive electrode based on an increase in the binder which is a non-conductor.

From the above, it is clear that the amount of the binder is required to be 0.2 to 1.4 parts by weight per 100 parts by weight of an active material, and the amount of the conductive material is required to be 1 to 2.5 parts by weight per 100 parts by weight of an active material, considering a balance of capacity of battery, capacity retention rate, and amount of gas generation.

EXAMPLE 6

An electrode plate of a positive electrode was made in the same manner as in Example 5 except for the following changes.

Acetylene black (AB) in an amount of 2.5 parts by weight per 100 parts by weight of the active material was used as a conductive material, in the primary kneading, and 0.8 parts by weight of 2-EHA-AA-AN per 100 parts by weight of the active material was used as a binder, and 0.1 parts by weight, 0.2 parts by weight, 0.8 parts by weight, and 1.0 parts by weight of CMC per 100 parts by weight of the active material were used as a binder in the secondary kneading, as in the battery 14 of Example 5, to obtain electrode plates 27, 28, 29, and 30, respectively.

Acetylene black (AB) in an amount of 1.0 parts by weight per 100 parts by weight of the active material was used as a conductive material, in the primary kneading, and 0.8 parts by weight of 2-EHA-AA-AN per 100 parts by weight of the active material was used as a binder, and 0.1 parts by weight, 0.2 parts by weight, 0.8 parts by weight, and 1.0 parts by weight of CMC per 100 parts by weight of the active material were used as a binder in the secondary kneading, as in the battery 19 of Example 5, to obtain electrode plates 31, 32, 33, and 34, respectively.

Then, acetylene black (AB) in an amount of 2.0 parts by weight per 100 parts by weight of the active material was used as a conductive material, in the primary kneading, and 0.8 parts by weight of 2-EHA-AA-AN per 100 parts by weight of the active material was used as a binder, and 0.1 parts by weight, 0.2 parts by weight, 0.8 parts by weight, and 1.0 part by weight of CMC per 100 parts by weight of the active material were used as a binder in the secondary kneading, as in the battery 24 of Example 5, to obtain electrode plates 35, 36, 37, and 38, respectively.

COMPARATIVE EXAMPLE 3

An electrode plate 39 was prepared in the same manner as in Comparative Example 1, except that acetylene black (AB) in an amount of 2 parts by weight per 100 parts by weight of the active material was used as a conductive material, and 0.8 parts by weight of 2-EHA-AA-AN per 100 parts by weight of the active material was used as a binder.

COMPARATIVE EXAMPLE 4

An electrode plate 40 was prepared in the same manner as in Comparative Example 2, except that acetylene black (AB) in an amount of 2 parts by weight per 100 parts by weight of the active material was used as a conductive material, and 0.8 parts by weight of 2-EHA-AA-AN per 100 parts by weight of the active material was used as a binder.

Then, lithium ion secondary batteries 27 to 40 were prepared in the same manner as in Example 1, by using the electrode plates 27 to 40 thus obtained.

(Evaluation 7)

The electrode plates 27 to 40 thus obtained were evaluated for [Separation of Positive Electrode Material Mixture] in the same manner as in (Evaluation 3). Also, the batteries 27 to 40 thus obtained were evaluated for [Capacity Retention Rate after 200 Cycles] in the same manner as in (Evaluation 2), and for [Amount of Gas Generated at the Time of Storing] in the same manner as in (Evaluation 5). The results are shown in Table 7.

TABLE 7

| | Battery | Amount of conductive material (parts by weight) | Amount of binder (parts by weight) | Amount of thickener (parts by weight) | Capacity retention rate after 200 cycles (%) | Amount of gas generated at the time of storing (ml) |
|---|---|---|---|---|---|---|
| Ex. 6 | 27 | 2.5 | 0.8 | 0.1 | 88 | 6.1 |
| | 28 | 2.5 | 0.8 | 0.2 | 88 | 4.0 |
| Ex. 5 | 14 | 2.5 | 0.8 | 0.4 | 89 | 3.9 |
| Ex. 6 | 29 | 2.5 | 0.8 | 0.8 | 88 | 3.8 |
| | 30 | 2.5 | 0.8 | 1.0 | 87 | 3.6 |
| Ex. 6 | 31 | 1.0 | 0.8 | 0.1 | 84 | 3.4 |
| | 32 | 1.0 | 0.8 | 0.2 | 85 | 3.3 |
| Ex. 5 | 19 | 1.0 | 0.8 | 0.4 | 85 | 3.2 |
| Ex. 6 | 33 | 1.0 | 0.8 | 0.8 | 84 | 3.2 |
| | 34 | 1.0 | 0.8 | 1.0 | 84 | 3.1 |
| Ex. 6 | 35 | 2.0 | 0.8 | 0.1 | 87 | 4.9 |
| | 36 | 2.0 | 0.8 | 0.2 | 87 | 3.9 |
| Ex. 5 | 24 | 2.0 | 0.8 | 0.4 | 88 | 3.6 |
| Ex. 6 | 37 | 2.0 | 0.8 | 0.8 | 87 | 3.5 |
| | 38 | 2.0 | 0.8 | 1.0 | 86 | 3.5 |
| Com. Ex. 3 | 39 | 2.0 | 0.8 | 0.4 | 82 | 3.4 |
| Com. Ex. 4 | 40 | 2.0 | 0.8 | 0.4 | 77 | 3.2 |

The evaluation results of Table 7 are explained below.

When the amount of the thickener was small, the capacity retention rate after 200 cycles lowered, and the amount of gas tended to increase. On the other hand, when the amount of the thickener was large, the amount of gas decreased, but the capacity retention rate after 200 cycles tended to become lower, as in the case when the amount of the thickener is small.

The decrease in capacity retention rate after 200 cycles when the amount of the thickener was low was probably because the dispersion of the conductive material was insufficient due to the low amount of the thickener which has a function of surfactant, and efficient conductive network was not formed. Additionally, the increase in the amount of gas was probably due to an increase in contact surface of the conductive material and the non-aqueous electrolyte in the battery, relative to a decrease in the amount of the thickener adsorbed by the conductive material.

The decrease in an amount of gas when the amount of the thickener was large was probably due to a relative decrease in contact surface of the conductive material and the non-aqueous electrolyte in the battery. However, a decrease in the capacity retention rate after 200 cycles was probably due to a decrease in electron conductivity of the positive electrode based on an increase in the binder which is a non-conductor.

From the above, it is clear that the amount of the thickener is required to be 0.2 to 0.8 parts by weight per 100 parts by weight of an active material, and the amount of the conductive material is required to be 1 to 2.5 parts by weight per 100 parts by weight of an active material, considering the balance of capacity of battery, capacity retention rate, and amount of gas generated.

EXAMPLE 7

An electrode plate of a positive electrode was made using 0.8 parts by weight of 2-EHA-AA-AN per 100 parts by weight of the active material as a binder, in the same manner as battery 3 of Example 3 except for the following changes.

In this example, various kind of thickener were used. That is, CMCs giving a 1 wt % aqueous solution having a viscosity of 2.5 Pa·s, 6.0 Pa·s, 10.0 Pa·s, 18.0 Pa·s, and 22.0 Pa·s at 25° C. were used as a thickener in an amount of 0.4 parts by weight per 100 parts by weight of the active material to obtain electrode plates 41, 42, 43, 44, and 45, respectively.

Then, lithium ion secondary batteries 41 to 45 were made by using the electrode plates 41 to 45 thus obtained, respectively.

(Evaluation 8)

The electrode plates 41 to 45 thus obtained and the electrode plate 3 of Example 3 were evaluated for [Variations in Amount of Electrode Material Mixture] in the same manner as in (Evaluation 1). Also, the batteries 41 to 45 thus obtained and the battery 3 of Example 3 were evaluated for [Variations in Battery Capacity] and [Capacity Retention Rate after 200 Cycles] in the same manner as in (Evaluation 2). The results are shown in Table 8.

TABLE 8

| Ex. 7 | Viscosity of 1 wt % aqueous solution (Pa·s) | Variations in weight of electrode material mixture applied to current collector (%) | Variations in battery capacity (%) | Capacity retention rate after 200 cycles (%) |
|---|---|---|---|---|
| Battery 3 | 1.7 | ±0.7 | ±0.9 | 91 |
| Battery 41 | 2.5 | ±0.4 | ±0.5 | 94 |
| Battery 42 | 6.0 | ±0.5 | ±0.5 | 94 |
| Battery 43 | 10.0 | ±0.5 | ±0.6 | 95 |
| Battery 44 | 18.0 | ±0.6 | ±0.8 | 93 |
| Battery 45 | 22.0 | ±1.2 | ±1.9 | 85 |

The evaluation results of Table 8 are explained below.

When a thickener giving 1 wt % aqueous solution having a viscosity of 1.7 Pa·s was used, uneven application of electrode material mixture slurry on a current collector occurred, due to comparatively lower degree of viscosity of the thickener. Therefore, as to the battery 3, variations in battery capacity became greater comparatively, and capacity retention rate after 200 cycles became lower comparatively.

When a thickener giving 1 wt % aqueous solution having a viscosity of 22.0 Pa·s was used, uneven application of electrode material mixture slurry on a current collector occurred, due to excessively high viscosity of the thickener. Therefore, as to the battery 45, variations in battery capacity became great, and capacity retention rate after 200 cycles became low. When the electrode plate of the battery 45 with uneven application of electrode material mixture slurry was used for the positive electrode, lithium ion that was not accepted by the negative electrode active material probably became more prone to deposit as lithium metal, due to an excess of local load of the negative electrode. Thus, capacity retention rate after 200 cycles of the battery 45 was drastically lowered for such reason.

In the batteries 41 to 44, in which a thickener giving 1 wt % aqueous solution having a viscosity of 2.5 to 18 Pa·s was used, unevenness of application of the electrode material mixture slurry on the current collector and variations in battery capacity were less, and capacity retention rate after 200 cycles was quite excellent. Especially, in the batteries 41 to 43, in which a thickener giving 1 wt % aqueous solution having a viscosity of 2.5 to 10 Pa·s was used, unevenness of application of the electrode material mixture slurry on the current collector and variations in battery capacity became quite less. When a viscosity of CMC aqueous solution became excessively high, the viscosity of CMC tended to contribute more to increase merely a stickiness of the slurry, than contribute to a dispersion property of the slurry. It was probably due to such reason that variation in weight of the electrode material mixture slurry applied on the current collector became a little greater.

EXAMPLE 8

An electrode plate of a positive electrode was made using 0.8 parts by weight of 2-EHA-AA-AN per 100 parts by weight of the active material as a binder, in the same manner as the battery 3 of Example 3 except for the following changes.

In this example, a specific surface area of the active material was changed. That is, lithium cobaltate having specific surface areas of 0.8 $m^2/g$, 0.5 $m^2/g$, 0.2 $m^2/g$, and 0.1 $m^2/g$ measured by BET method were used to obtain electrode plates 46, 47, 48, and 49, respectively.

The lithium cobaltates having different specific surface areas were prepared in the same manner as in Example 1, except that surface, area of one of the raw materials, tricobalt tetroxide, was changed.

Then, lithium ion secondary batteries 46 to 49 were made in the same manner as in Example 1 by using the electrode plates 46 to 49 thus obtained, respectively.

(Evaluation 9)

The batteries 46 to 49 thus obtained and the battery 3 of Example 3 were evaluated for [Capacity Retention Rate after 200 Cycles] in the same manner as in (Evaluation 2). Also, the batteries 46 to 49 thus obtained and the battery 3 were comparatively evaluated for safety at an overcharged state and high rate discharge property in the following manner. The results are shown in Table 9.

[Safety in Overcharged State]

The run-in charge/discharge were conducted twice under the same condition as the charge/discharge condition X in (Evaluation 2) for conforming products.

The batteries completed the run-in charge/discharge was stored in a charged state for 7 days at 45° C. ambient temperature. The charge was conducted under the same condition as the charge condition Y in (Evaluation 2).

Next, the battery after storage was discharged until the battery voltage reached 3 V at a constant current of 400 mA, and then charged with a constant current of 2000 mA, and the charge was stopped when a temperature of the battery can (battery case) reached 90° C. Subsequently, the temperature of the battery after the charge was stopped was observed, and the highest temperature reached was measured.

[High Rate Discharge Property]

(2 C/0.2 C Capacity Rate)

The run-in charge/discharge was conducted twice under the same condition as the charge/discharge condition X in (Evaluation 2) for conforming products.

The batteries completed the run-in charge/discharge were stored in a charged state for 7 days at 45° C. ambient temperature. The charge was conducted under the same condition as the charge condition Y in (Evaluation 2).

Next, the battery after the storage was charged/discharged under the charge/discharge condition V below at 25° C. and discharge capacity at 0.2 C discharge was obtained.

<Charge/Discharge Condition V>
Constant current charge: 1400 mA
End-of-charge voltage: 4.2 V
Constant voltage charge: 4.2 V
End-of-charge current: 100 mA
Constant current discharge: 400 mA
End-of-discharge voltage: 3 V Then, the same battery was charged/discharged under the charge/discharge condition W below at 25° C., and discharge capacity at 2 C discharge was obtained.

<Charge/Discharge Condition W>
Constant current charge: 1400 mA
End-of-charge voltage: 4.2 V
Constant voltage charge: 4.2 V
End-of-charge current: 100 mA
Constant current discharge: 4000 mA
End-of-discharge voltage: 3 V The proportion of the discharge capacity at 2 C discharge to the discharge capacity at 0.2 C discharge was determined on percentage (2 C/0.2 C capacity rate).

TABLE 9

| Example 8 | Specific surface area of positive electrode active material measured by BET method ($m^2/g$) | Capacity retention rate after 200 cycles (%) | The highest temperature reached of the overcharged battery after the temperature was increased until 90° C. (° C.) | 2 C/0.2 C capacity rate (25° C.) (%) |
|---|---|---|---|---|
| Battery 3 | 1.4 | 91 | 124 | 95 |
| Battery 46 | 0.8 | 89 | 107 | 96 |
| Battery 47 | 0.5 | 88 | 99 | 93 |
| Battery 48 | 0.2 | 88 | 94 | 88 |
| Battery 49 | 0.1 | 85 | 93 | 79 |

The evaluation results of Table 9 are explained below.

When the specific surface area of the positive electrode active material measured by BET method was 0.1 $m^2/g$, capacity retention rate after 200 cycles was reduced to a certain degree, due to a smaller reaction surface of the positive electrode active material. Also, although the safety of the battery at an overcharged state was satisfactory, 2 C/0.2 C capacity rate which would be an indicator of high rate discharge property decreased to a greater extent comparatively.

Also, when the specific surface area measured by BET method was over 0.8 $m^2/g$, the highest temperature reached 120° C. and over, although the temperature would not be a problem practically. When the specific surface area was 1.4 $m^2/g$, although the 2 C/0.2 C capacity rate was quite excellent, superiority was not found compared with the case of a specific surface area of 0.8 $m^2/g$.

From the above, it is clear that the specific surface area measured by BET method of an active material mixture is required to be 0.2 to 0.8 $m^2/g$, in order to maintain higher safety of a battery in an overcharged state, while obtaining an excellent balance of cycle life and high rate discharge property.

EXAMPLE 9

An electrode plate of a positive electrode was made in the same manner as in Example 1 except for the following.

In this example, 0.1 parts by weight, 0.2 parts by weight, 0.8 parts by weight, 1.1 parts by weight, 1.4 parts by weight, and 2.0 parts by weight of 2-EHA-AA-AN per 100 parts by weight of the active material were used in the secondary kneading, instead of using 2.4 parts by weight of PTFE-HFP per 100 parts by weight of the active material as a binder to obtain electrode plates 50, 51, 52, 53, 54, and 55, respectively. The porosities of all the electrode material mixture layers of the electrode plates were controlled to be 22%.

A dispersion of the 2-EHA-AA-AN stably dispersed in water in a form of fine particles was used. The 2-EHA-AA-AN content in the water dispersion was 40 wt %.

Then, lithium ion secondary batteries 50, 51, 52, 53, 54, and 55 were made respectively in the same manner as in Example 1, by using the electrode plates 50, 51, 52, 53, 54, and 55.

(Evaluation 10)

The electrode plates 50, 51, 52, 53, 54, and 55, and the batteries 50, 51, 52, 53, 54, and 55 were evaluated for [Separation of Positive Electrode Material Mixture] in the same manner as in (Evaluation 3), and for [Battery Capacity] in the same manner as in (Evaluation 4). The results are shown in Table 10 below.

TABLE 10

| Example 9 | Amount of binder (parts by weight) | Separation of electrode material mixture (piece/20 pieces) | Battery Capacity (mAh) |
|---|---|---|---|
| Battery 50 | 0.1 | 5 | 2320 |
| Battery 51 | 0.2 | 1 | 2303 |
| Battery 52 | 0.8 | 0 | 2283 |
| Battery 53 | 1.1 | 0 | 2271 |
| Battery 54 | 1.4 | 0 | 2253 |
| Battery 55 | 2.0 | 0 | 2211 |

The results of Table 10 are explained in the following.

When an amount of the binder was 0.1 parts by weight per 100 parts by weight of the active material (battery 50), separations of the positive electrode material mixture from the current collector in several electrode plates occurred. Also, when an amount of the binder was 2 parts by weight per 100 parts by weight of the active material (battery 55), battery capacity showed a comparatively notable decrease. The comparatively notable decrease in the battery capacity was probably due to an acceleration of reduction in discharge capacity by an increase of resistance component to a battery reaction, in addition to a decrease in a percentage of the active material in the positive electrode active material (a reduction in design capacity). On the other hand, in all of the electrode plates of batteries 51 to 54, almost no separations of the positive electrode material mixture from the current collector occurred, and also the battery capacities were high. When an amount of the binder was 1.4 parts by weight per 100 parts by weight of the active material (battery 54), the battery capacity was reduced compared with battery 50 to 53: however, sufficiently high capacity was obtained compared with the conventional ones.

EXAMPLE 10

A battery 56 of the same lithium ion secondary battery as the battery 3 of Example 3 was made by making a porosity of the positive electrode material mixture layer to 22%. That is, the positive electrode material mixture layer of the battery 56 included 0.8 parts by weight of 2-EHA-AA-AN per 100 parts by weight of the active material as a binder. On both sides of the positive electrode current collector portion located at the outermost perimeter of the electrode group of the battery 56 (i.e., battery 3), electrode material mixture layers were supported.

A battery 57 of the same lithium ion secondary battery as the battery 3 with 22% porosity of the positive electrode material mixture layer was made except that the both sides of the positive electrode current collector portion located at the outermost perimeter of electrode group not supporting electrode material mixture layer was formed to be an exposed part. That is, the positive electrode material mixture layer of the battery 57 included 0.8 parts by weight of 2-EHA-AA-AN per 100 parts by weight of the active material as a binder. The electrode material mixture slurry was applied to the current collector intermittently by die-coating, in order to form the exposed part in the positive electrode current collector not supporting electrode material mixture layers on both sides thereof.

(Evaluation 11)

The batteries 56 and 57 thus obtained were evaluated comparatively by the method shown below. The results are shown in Table 11.

[Nail Penetration Test]

The batteries thus made were charged/discharged twice as run-in under the same condition as the charge/discharge condition X in (Evaluation 2).

The batteries completed the run-in charge/discharge were charged under the same condition as the charge condition Y in (Evaluation 2), and then stored at the charged state for 7 days at 45° C. ambient temperature. Subsequently, the batteries after storage were discharged at a constant current of 400 mA until the voltages of the batteries became 3V.

Next, the batteries after the storage were charged under the following condition (Charge Condition V).

<Charge Condition V>
Constant current charge: 1400 mA
End-of charge voltage: 4.25 V
Constant voltage charge: 4.25 V
End-of charge current: 100 mA For the batteries after the charge, a round iron nail with a diameter of 2.5 mm was penetrated at a speed of 5 mm/second under 20° C. ambient temperature, and a heat generation was observed. The highest temperature reached at the penetration point are shown in table 11.

TABLE 11

| Example 10 | Positive electrode material mixture layer at the outermost perimeter of electrode group | Highest temperature reached in nail penetration test (° C.) |
|---|---|---|
| Battery 56 | Yes (not having an exposed part) | 121 |
| Battery 57 | No (having an exposed part) | 82 |

The results of table 11 are explained below.

When a positive electrode current collector portion located at the outermost perimeter of electrode group was supporting electrode material mixture layer, comparatively notable heat generation occurred in the nail penetration test (battery 56). A short circuit reaction occurs when a negative electrode and a positive electrode are made to have contact with each other by the nail penetration test. It was thought that the heat generation gradually progressed, since the positive electrode material mixture layer having comparatively high resistance existed on the outermost perimeter of the electrode groups of the battery 56. The heat generation of the battery 56 was to an extent that would not be a problem practically: however, in view of a pursuit of a higher safety, further low heat generation level is desired.

When an exposed part was provided at the positive electrode current collector portion located at the outermost perimeter of the electrode group, the exposed part not supporting electrode material mixture layer on both sides thereof, heat generation by the nail penetration was suppressed drastically (battery 57). This was probably because the short circuit reaction was completed, due to the fact that the nail could have a direct contact with the positive electrode current collector having low resistivity (aluminum), thereby causing a comparatively quick decrease in voltage.

From the above, it is clear that an exposed part of the current collector not supporting electrode material mixture layer on both sides thereof are desired to be provided at the outermost perimeter of the electrode group, in view of a pursuit of a higher safety for a short circuit. According to the present invention, productivity of a battery formed as such structure can be drastically improved.

EXAMPLE 11

Electrode plates 58, 59, 60, 61, and 62 same as the electrode plate of the battery 57 of Example 10 (electrode plate 57) were made except that porosities of the positive electrode material mixture layers were made to become 15%, 18%, 25%, 28%, and 31% respectively by controlling a pressure at the time of pressing the dried coating. That is, the positive electrode material mixture layers of these electrode plates included 0.8 parts by weight of 2-EHA-AA-AN per 100 parts by weight of the active material as a binder.

Then, lithium ion secondary batteries 58, 59, 60, 61, and 62 same as the battery 57 in Example 10 were made except that the electrode plates 58, 59, 60, 61, and 62 were used. That is, on the positive electrode current collector portion located at the outermost perimeter of the electrode group of these batteries, there were provided an exposed part not supporting electrode material mixture layer on both sides thereof.

(Evaluation 12)

The electrode plates 57 to 62 and the batteries 57 to 62 were evaluated for [Nail Penetration Test] as in (Evaluation 11), and for [Capacity Retention Rate after 200 Cycles] as in (Evaluation 2), and further evaluated by the method shown below. The results are shown in Table 12.

[Injection Property of Non-Aqueous Electrolyte]

The non-aqueous electrolyte was given dividedly five times to the electrode group inserted in the battery case to be immersed. The amount of the electrolyte to be given and the decrease in pressure for each time are shown below.

(a) 1st to 3rd Times

After injecting the non-aqueous electrolyte in an amount of 1.1 g, an internal pressure of the battery case was decreased to 10 kPa. After leaving the case as it is for 1 minute, the case was released to an atmospheric pressure.

(b) 4th Time

After injecting the non-aqueous electrolyte in an amount of 1.1 g, an internal pressure of the battery case was decreased to 10 kPa. After leaving the case as it is for 3 minutes, the case was released to an atmospheric pressure.

(c) 5th Time

After injecting the non-aqueous electrolyte in an amount of 1.1 g, an internal pressure of the battery case was decreased to 10 kPa. After leaving the case as it is for 3 minutes, the case was released to an atmospheric pressure. Then again, an internal pressure of the battery case was decreased to 10 kPa. After leaving the case as it is for 3 minutes, the case was released to an atmospheric pressure.

After the 5 injecting steps of the electrolyte, the time for the electrolyte stayed on top of the electrode group to penetrate into the inside of the electrode group completely was measured.

[Conditions of Boundary between Electrode Material Mixture Layer and Exposed Part on Current Collector]

An occurrence of a partial fracture of the current collector at the boundary between the positive electrode material mixture layer pressed until achieving a predetermined porosity, and the exposed part of the positive electrode current collector was observed visually.

TABLE 12

| Example 11 | Porosity of electrode material mixture layer (%) | Injection property of non-aqueous electrolyte (minutes) | Boundary of exposed part of current collector and electrode material mixture layer | Highest temperature reached at nail penetration test (° C.) | Capacity retention rate after 200 cycles (%) |
|---|---|---|---|---|---|
| Battery 58 | 15 | 73 | Fracture | 119 | 91 |
| Battery 59 | 18 | 14 | No fracture | 83 | 90 |
| Battery 57 (Ex. 10) | 22 | 6 | No fracture | 82 | 89 |
| Battery 60 | 25 | 2 | No fracture | 84 | 89 |
| Battery 61 | 28 | 1 | No fracture | 82 | 88 |
| Battery 62 | 31 | 1 | No fracture | 85 | 82 |

The results of the evaluation in Table 12 are explained below.

When a porosity of the positive electrode material mixture layer was 15% (battery 58), it took a quite long time for the electrolyte to completely penetrate into the electrode group. This was probably because the pores in the electrode material mixture layer would be too few at the porosity of 15%, thereby causing the electrolyte which should be absorbed in the positive electrode to stay on the top of the electrode group, preventing the air inside of the electrode group to be released out, and decreasing injection property of the electrolyte.

Also, when a porosity of the positive electrode material mixture layer was 15%, a partial fracture of the current collector was observed at the boundary of the electrode material mixture layer and the exposed part on the current collector. Even when forming an electrode material mixture layer with full elasticity, when porosity of the electrode material mixture layer is made too small, excessive pressure at the boundary of the electrode material mixture layer and the exposed part on the current collector would be applied at the time of pressing a dried coating.

Further, when a porosity of the positive electrode material mixture layer was 15%, in the nail penetration test, the highest temperature reached became comparatively high. This was probably because the electrode plate swelled at the time of charging, causing an internal stress in the electrode group, the boundary between the electrode material mixture layer and the exposed part on the current collector to fracture, and the exposed part on the current collector to fail to function as a safety mechanism.

Next, when a porosity of the positive electrode material mixture layer was 31% (battery 62), cycle life property of the battery was slightly decreased, though the decrease was to a level that would not be a problem practically. This was probably due to an excessive porosity secured in the electrode material mixture layer, causing the conductive network by the conductive material to loosen and to become insufficient, thereby decreasing a battery reaction with time.

On the other hand, when a porosity of the positive electrode material mixture layer was 18 to 28% (battery 59 to 61), excellent results were shown in every evaluation. From the results of Table 12, it is clear that the porosity of the electrode material mixture layer is desirably controlled to be 18 to 28%, and preferably to 18 to 25%, in considering a balance for safety for internal short circuit of battery, cycle life, productivity, and battery capacity.

The present invention is appropriate for obtaining a non-aqueous secondary battery with less variation in battery capacity, and excellent in cycle life. According to a preferable embodiment of the present invention, a higher battery capacity, suppression of gas generation, and improvements in safety can be achieved. The present invention is useful in a high capacity non-aqueous secondary battery for a portable electric device, especially for a lithium ion secondary battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for manufacturing an electrode plate of a positive electrode for a non-aqueous secondary battery comprising the steps of:
- (a) preparing an active material A, a conductive material B, a binder C, a thickener D, and a liquid component E,
  said thickener D being in a powder state and being soluble in said liquid component E,
  said conductive material B comprising at least a carbon material,
  said thickener D comprising at least a water-soluble polymer, and
  said liquid component E comprising at least water,
- (b) preparing a slurry comprising said liquid component E and an electrode material mixture comprising said active material A, said conductive material B, said binder C, and said thickener D, and
- (c) applying said slurry on a current collector,
  wherein said step (b) includes kneading said thickener D in a powder state, said active material A and said conductive material B together with said liquid component E to prepare a primary kneaded matter, and then kneading said primary kneaded matter, said binder C, and an additional liquid component to prepare said slurry as a secondary kneaded matter, wherein a viscosity of an aqueous solution dissolving 1 wt % thickener D is 2.5 to 18 Pa·s at 25° C.

2. The method for manufacturing an electrode plate of a positive electrode for a non-aqueous secondary battery in accordance with claim 1, wherein the binder C is dispersed in said additional liquid component and then added to said primary kneaded matter in preparing said secondary kneaded matter.

3. The method for manufacturing an electrode plate of a positive electrode for a non-aqueous secondary battery in accordance with claim 1, wherein at least said additional liquid component is added in portions to said primary kneaded matter in a plurality of times in preparing said secondary kneaded matter.

4. The method for manufacturing an electrode plate of a positive electrode for a non-aqueous secondary battery in accordance with claim 1, wherein said additional liquid component comprises the liquid component E.

5. The method for manufacturing an electrode plate of a positive electrode for a non-aqueous secondary battery in accordance with claim 1, wherein the binder C comprises rubber particles having at least an acrylonitrile unit.

6. The method for manufacturing an electrode plate of a positive electrode for a non-aqueous secondary battery in accordance with claim 1, wherein a specific surface area of the active material A measured by BET method is 0.2 to 0.8 $m^2/g$.

7. The method for manufacturing an electrode plate of a positive electrode for a non-aqueous secondary battery in accordance with claim 1, wherein an amount of the conductive material B contained in said electrode material mixture is 1 to 2.5 parts by weight per 100 parts by weight of the active material A.

8. The method for manufacturing an electrode plate of a positive electrode for a non-aqueous secondary battery in accordance with claim 1, wherein an amount of the binder C contained in said electrode material mixture is 0.2 to 1.4 parts by weight per 100 parts by weight of the active material A.

9. The method for manufacturing an electrode plate of a positive electrode for a non-aqueous secondary battery in accordance with claim 1, wherein an amount of the thickener D contained in said electrode material mixture is 0.2 to 0.8 parts by weight per 100 parts by weight of the active material A.

10. The method for manufacturing an electrode plate of a positive electrode for a non-aqueous secondary battery in accordance with claim 1, wherein an amount of the conductive material B contained in said electrode material mixture is 1 to 2.5 parts by weight per 100 parts by weight of the active material A, and an amount of the binder C contained in said electrode material mixture is 0.2 to 1.4 parts by weight per 100 parts by weight of the active material A.

11. The method for manufacturing an electrode plate of a positive electrode for a non-aqueous secondary battery in accordance with claim 1, wherein an amount of the binder C contained in said electrode material mixture is 0.2 to 1.4 parts by weight per 100 parts by weight of the active material A, and a viscosity of an aqueous solution dissolving 1 wt % thickener D is 2.5 to 18 Pa·s at 25° C.

12. The method for manufacturing an electrode plate of a positive electrode for a non-aqueous secondary battery in accordance with claim 1, wherein the thickener D comprises at least carboxymethyl cellulose.

13. The method for manufacturing an electrode plate of a positive electrode for a non-aqueous secondary battery in accordance with claim 1, wherein a specific surface area of the active material A measured by BET method is 0.2 to 0.8 $m^2/g$, and an amount of the binder C contained in said electrode material mixture is 0.2 to 1.4 parts by weight per 100 parts by weight of the active material A.

14. The method for manufacturing an electrode plate of a positive electrode for a non-aqueous secondary battery in accordance with claim 6, wherein the active material A comprises at least a composite oxide of a transition metal and lithium.

15. The method for manufacturing an electrode plate of a positive electrode for a non-aqueous secondary battery in accordance with claim 1, further comprising drying the coating of said slurry applied on said current collector and forming an electrode material mixture layer having 18 to 28% porosity from the dried coating, said porosity being a volume percentage of micropores in said material mixture layer, wherein an amount of the binder C contained in said electrode material mixture is 0.2 to 1.4 parts by weight per 100 parts by weight of the active material A.

16. The method for manufacturing an electrode plate of a positive electrode for a non-aqueous secondary battery in accordance with claim 15, further comprising pressing said dried coating.

17. The method for manufacturing an electrode plate of a positive electrode for a non-aqueous secondary battery in accordance with claim 15, wherein at least one exposed part is formed in said current collector, said exposed part not supporting said material mixture layer on both sides thereof, and a lead is not supposed to be connected to said exposed part.

18. An electrode plate of a positive electrode for a non-aqueous secondary battery comprising an electrode material mixture layer and a current collector supporting said electrode material mixture layer,
   said electrode material mixture layer comprising an active material A, a conductive material B, a binder C, and a thickener D,
   said conductive material B comprising at least a carbon material, said thickener D comprising at least a water-soluble polymer,
   an amount of the conductive material B contained in said electrode material mixture layer being 1 to 2.5 parts by weight per 100 parts by weight of the active material A, and
   an amount of the thickener D contained in said electrode material mixture layer being 0.2 to 0.8 parts by weight per 100 parts by weight of the active material A.
   said thickener D comprising at least carboxymethyl cellulose,
   and the viscosity of 1% by weight solution of the thickener D is 2.5 to 18 Pa·s at 25° C.

19. The electrode plate of positive electrode in accordance with claim 18, wherein a specific surface area of the active material A measured by BET method is 0.2 to 0.8 $m^2/g$.

20. The electrode plate of positive electrode in accordance with claim 18, wherein an amount of the binder C contained in said electrode material mixture layer is 0.2 to 1.4 parts by weight per 100 parts by weight of the active material A.

21. The electrode plate of positive electrode in accordance with claim 18, wherein the binder C comprises rubber particles having at least an acrylonitrile unit.

22. The electrode plate of positive electrode in accordance with claim 18, wherein a porosity of said electrode material mixture layer is 18 to 28%, said porosity being a volume percentage of micropores in said material mixture layer.

23. The electrode plate of positive electrode in accordance with claim 22, wherein said current collector has at least one exposed part not supporting said material mixture layer on both sides thereof, and a lead is not supposed to be connected to said exposed part.

* * * * *